(12) United States Patent  (10) Patent No.: US 6,529,969 B1
Inoue  (45) Date of Patent: Mar. 4, 2003

(54) RECEPTION METHOD AND APPARATUS FOR SEARCHING VARIOUS FIRST AND SECOND SOURCE DEVICES APAPTED TO SEND DATA SIGNALS TO ANALOG AND OPTICAL INPUT TERMINALS

(75) Inventor: Hiraku Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/472,077

(22) Filed: Dec. 23, 1999

(30) Foreign Application Priority Data

Dec. 25, 1998 (JP) .......................................... 10-370410

(51) Int. Cl.⁷ .............................. G06F 13/00; H04L 9/00
(52) U.S. Cl. .............................. 710/33; 710/31; 710/37; 710/73; 340/2.7; 340/123; 381/85; 381/123
(58) Field of Search ................... 381/85, 123; 340/2.7, 340/123; 710/33, 31, 37, 73

(56) References Cited

U.S. PATENT DOCUMENTS 3,922,641 A * 11/1975 Gates, Jr. ...................... 340/2.7
5,987,126 A * 11/1999 Okuyama et al. ........... 380/203
6,052,471 A * 4/2000 Van Ryzin ..................... 381/85

FOREIGN PATENT DOCUMENTS

EP 0 762 684 3/1997
WO WO 97 21310 6/1997
WO WO 97 49057 12/1997

OTHER PUBLICATIONS

Paskins, A "The IEEE 1394 Bus" The Institute of Electrical Engineers, Database Accession No. 5615497, XP002136108.

* cited by examiner

Primary Examiner—Jeffrey Gaffin
Assistant Examiner—Tammara Peyton
(74) Attorney, Agent, or Firm—Frommer Lawrence & Haug LLP; William S. Frommer; Gordon Kessler

(57) ABSTRACT

A reception apparatus or transmission and reception apparatus has a plurality of input terminals, and a plurality of apparatus are connected by a chain connection to a predetermined one of the input terminals. The input terminal at which the apparatus is to receive a signal is successively switched among the input terminals by selection operation of a user, and the apparatus connected to the predetermined input terminal are successively searched in response to the same selection operation of the user.

9 Claims, 15 Drawing Sheets

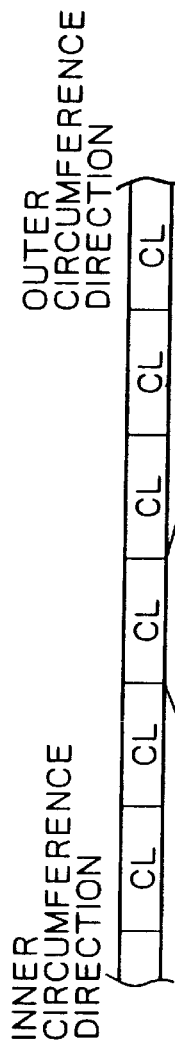
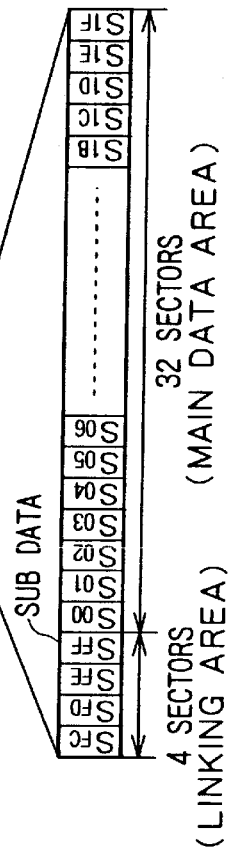
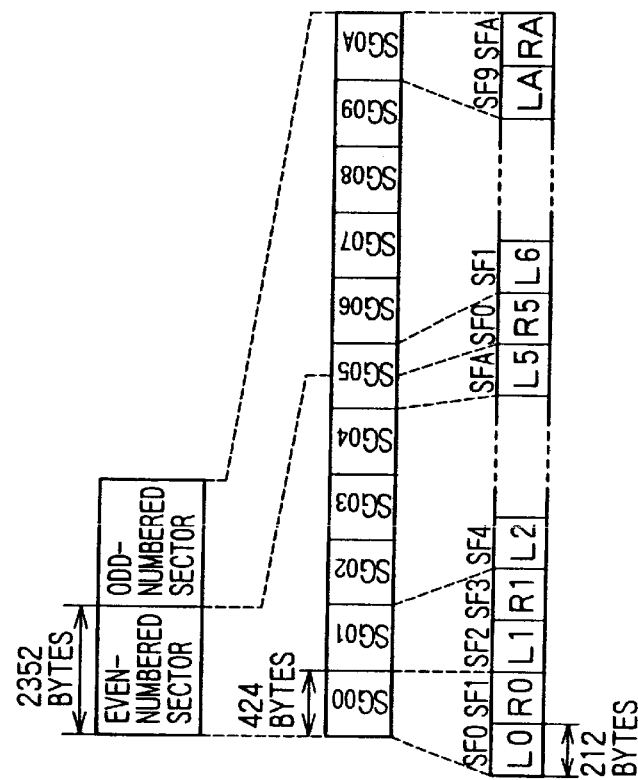
FIG. 2A  FIG. 2B  FIG. 2C  FIG. 2D  FIG. 2E

F I G. 3A    F I G. 3B
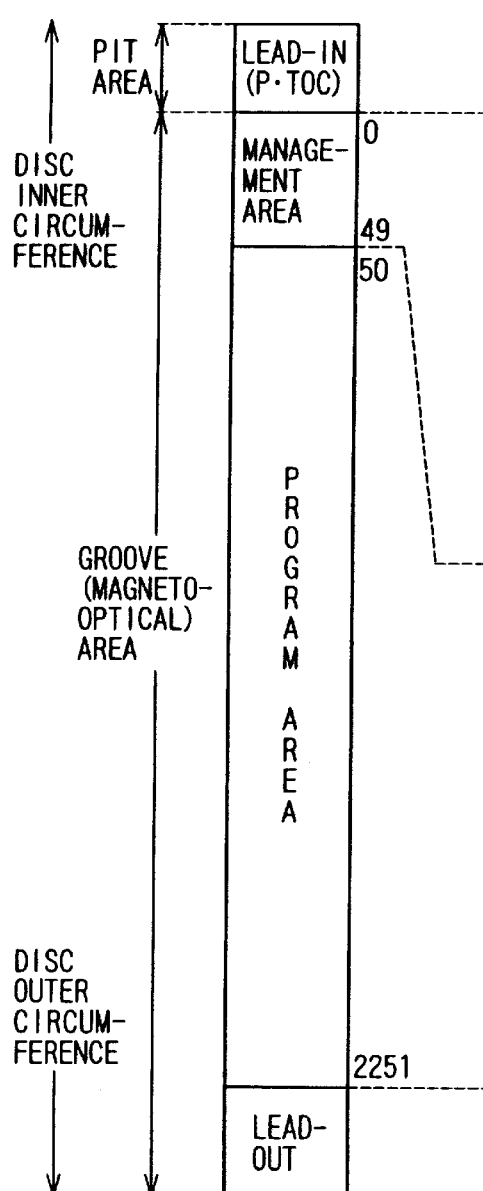
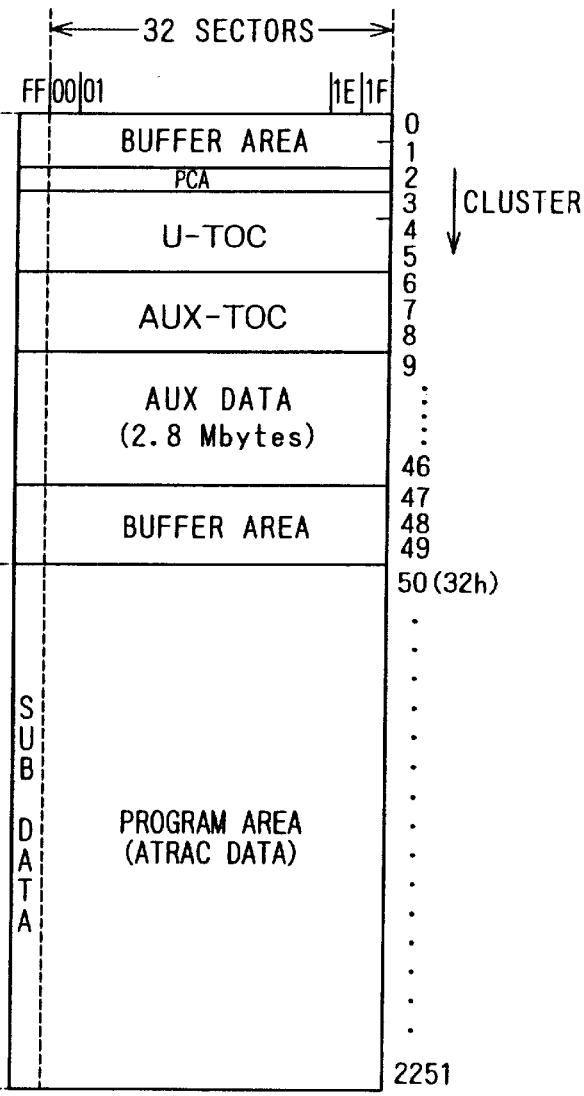

IEEE 1394 BUS CONNECTION

● OUTPUTTING PLUG CONTROL REGISTER oPCR[n]

● INPUTTING PLUG CONTROL REGISTER iPCR[n]

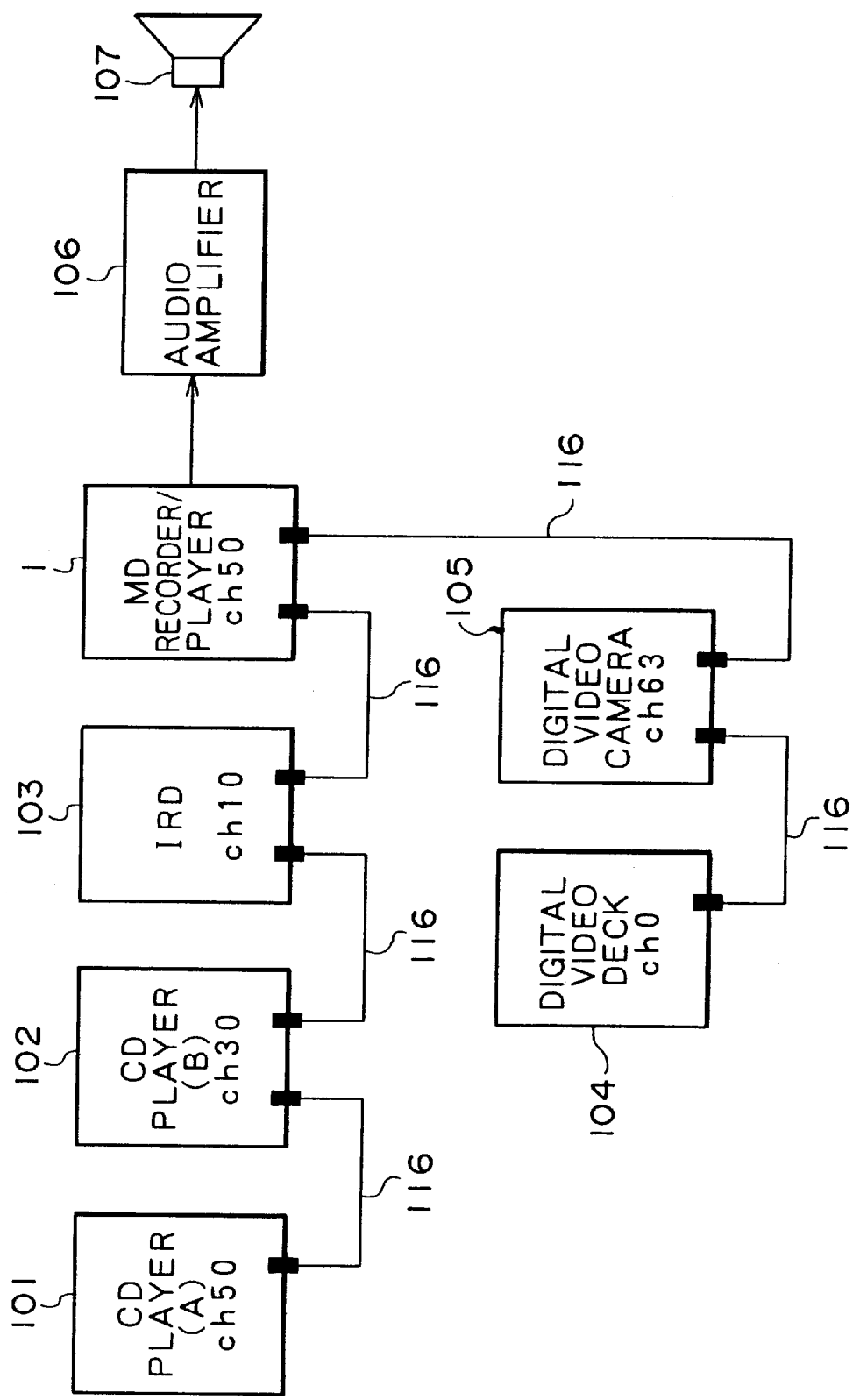

RECEPTION METHOD AND APPARATUS FOR SEARCHING VARIOUS FIRST AND SECOND SOURCE DEVICES APAPTED TO SEND DATA SIGNALS TO ANALOG AND OPTICAL INPUT TERMINALS

BACKGROUND OF THE INVENTION

1. Field of the Invention

This invention relates to a reception apparatus and a reception method by which data transmitted through a data interface in accordance with a predetermined data communication format is received.

2. Description of the Related Art

As a digital audio apparatus, for example, a CD player for reproducing a CD (Compact Disc: trademark) has been spread widely.

While the CD mentioned above is a disc for reproduction only, also a magneto-optical disc onto and from which audio data can be recorded and reproduced like a mini disc (MD, trademark) is being spread widely.

Further, in recent years, a data transmission system has been proposed wherein various electronic apparatus such as digital AV (Audio Visual) apparatus and a personal computer apparatus are connected to each other, for example, by data bus in compliance with an IEEE (Institute of Electrical Engineers) 1394 interface so that data may be communicated between them.

The IEEE 1394 interface is one of interfaces for serial data communication and is suitable for transmission of data for which the real time performance is required such as, for example, audio data or video data.

It is a possible idea to provide an AV system wherein various digital AV apparatus are connected to each other by an IEEE 1394 bus so that dubbing of AV data can be performed between the AV apparatus.

For example, since an IEEE 1394 interface allows communication of data between apparatus which are connected by a chain connection or a branch connection to each other, it is advantageous in that a system can be implemented by interconnecting apparatus suitably by means of a cable without particularly taking flows of signals into consideration within a range of a predetermined connection rule.

If an AV system including AV apparatus such as a CD player and an MD recorder/player is implemented utilizing an IEEE 1394 interface, then recording (dubbing) of audio data in the form of a digital signal reproduced by a certain AV apparatus as it is by means of a recording apparatus such as the MD recorder/player can be realized by an easy technique.

When data are transmitted by an IEEE 1394 interface, isochronous communication wherein data are transmitted periodically is utilized usually. In the isochronous communication, data can be communicated using 64 channels in the maximum.

Where it is intended to utilize this fact to communicate data between AV apparatus in order to effect dubbing of the data, it is a possible idea, as an example, to fixedly determine a channel to be used between the AV apparatus and use the predetermined channel to effect communication of data. This technique is actually adopted by a certain digital video camera system.

Where this technique is adopted, however, if the system is constructed such that, for example, three or more apparatus are interconnected by an IEEE 1394 bus, even if some bus band remains free, while communication is proceeding with the predetermined channel between a pair of apparatus in such a manner as described above, any other apparatus cannot use the bus band.

In particular, for example, while data are being transmitted from a certain apparatus over the fixed channel described above, if transmission of data is started over the same channel from another AV apparatus, from the rules of the IEEE 1394 interface, the channel is occupied by the second AV apparatus in place of the AV apparatus which has been communicating till then. If this actually occurs, then this gives rise to such a disadvantage that, for example, the input source for dubbing is changed over intermediately.

In order to eliminate the problem just described, for example, different channels from one another are allocated to different AV apparatus such that audio data may be transmitted over the different channels from the different AV apparatus while, for example, a recording apparatus is constructed so as to select one of the AV apparatus from which data to be recorded are being transmitted as a target recording source. In other words, the system is preferably constructed so that the recording apparatus can select a channel to be received.

When channel selection is performed by the recording apparatus in response to an operation of a user, it is demanded that such channel selection can be performed by an operation as simple as possible from the point of view of the convenience in use by the user.

As a countermeasure, if a personal computer is included in the AV system such that, for example, an operation depending upon a GUI can be performed using application software of the personal computer, then a simple and efficient operation can be achieved as the selection operation. In this instance, however, the personal computer must be owned by the user and thus imposes a burden upon the user. Further, the AV system is not completed only with AV apparatus and has a large scale.

Accordingly, it is demanded to provide a technique which is simple and convenient to use while an operation for causing a recording apparatus to effect channel selection completes itself with an operation for a recording apparatus itself.

SUMMARY OF THE INVENTION

It is an object of the present invention to provide a reception apparatus and a reception method by which selection of an audio source through an IEEE 1394 bus can be performed by simple and plain operation.

In order to attain the object described above, according to the present invention, a plurality of input terminals are successively switched in response to an operation of a user and a plurality of apparatus connected by a chain connection to a predetermined one of the terminals are successively searched in response to the operation of the user.

More particularly, according to the present invention, there is provided a reception apparatus, including an analog input terminal to which an analog signal is supplied, an optical input terminal to which a digital signal in the form of an optical signal is inputted, a digital input terminal to which a plurality of electronic apparatus are connected by a chain connection over a transmission line which allows data transmission by synchronous communication and asynchronous communication, operation means for selectively switching among the analog input terminal, the optical input terminal and the digital input terminal, search means for successively searching the plurality of electronic apparatus connected to the transmission line when the digital input terminal is selected by the operation means, discrimination means for discriminating whether or not data supplied from the electronic apparatus searched out by the search means has a form compliant with a format, and control means for controlling so that, when the discrimination means discriminates that the data supplied from the searched out electronic apparatus has a form compliant with the format, demodulation of the data is started, but when the discrimination means discriminates that the data supplied from the searched out electronic apparatus does not have a form compliant with the format, searching for another one of the electronic apparatus may be started by the search means.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2A is a diagrammatic view illustrating a data structure of clusters recorded on a recording track of a disc used in the recording and reproduction apparatus of FIG. 1;

FIG. 2B is a diagrammatic view illustrating a data structure of a sector which forms one cluster;

FIG. 2C is a diagrammatic view illustrating a data structure of a sound group formed from two sectors;

FIG. 2D is a diagrammatic view illustrating a data structure of 11 sound groups formed from 2 sectors;

FIG. 2E is a diagrammatic view illustrating a data area structure of a sound group which forms the 11 sound groups;

FIG. 3A is a diagrammatic view showing an area structure of the magneto-optical disc used in the magneto-optical disc recording and reproduction apparatus of FIG. 1;

FIG. 3B is a diagrammatic view showing details of an area structure of a management area and a program area of the disc shown in FIG. 3A;

FIG. 13 is a block diagram of an AV system to which the present invention is applied;

DESCRIPTION OF THE PREFERRED EMBODIMENT

A preferred embodiment of the present invention is described below.

In the present embodiment, the present invention is applied to a recording and reproduction apparatus which can perform recording onto and reproduction from a magneto-optical disc (mini disc) used as a recording medium.

The description proceeds in the following order.

Figure 1:
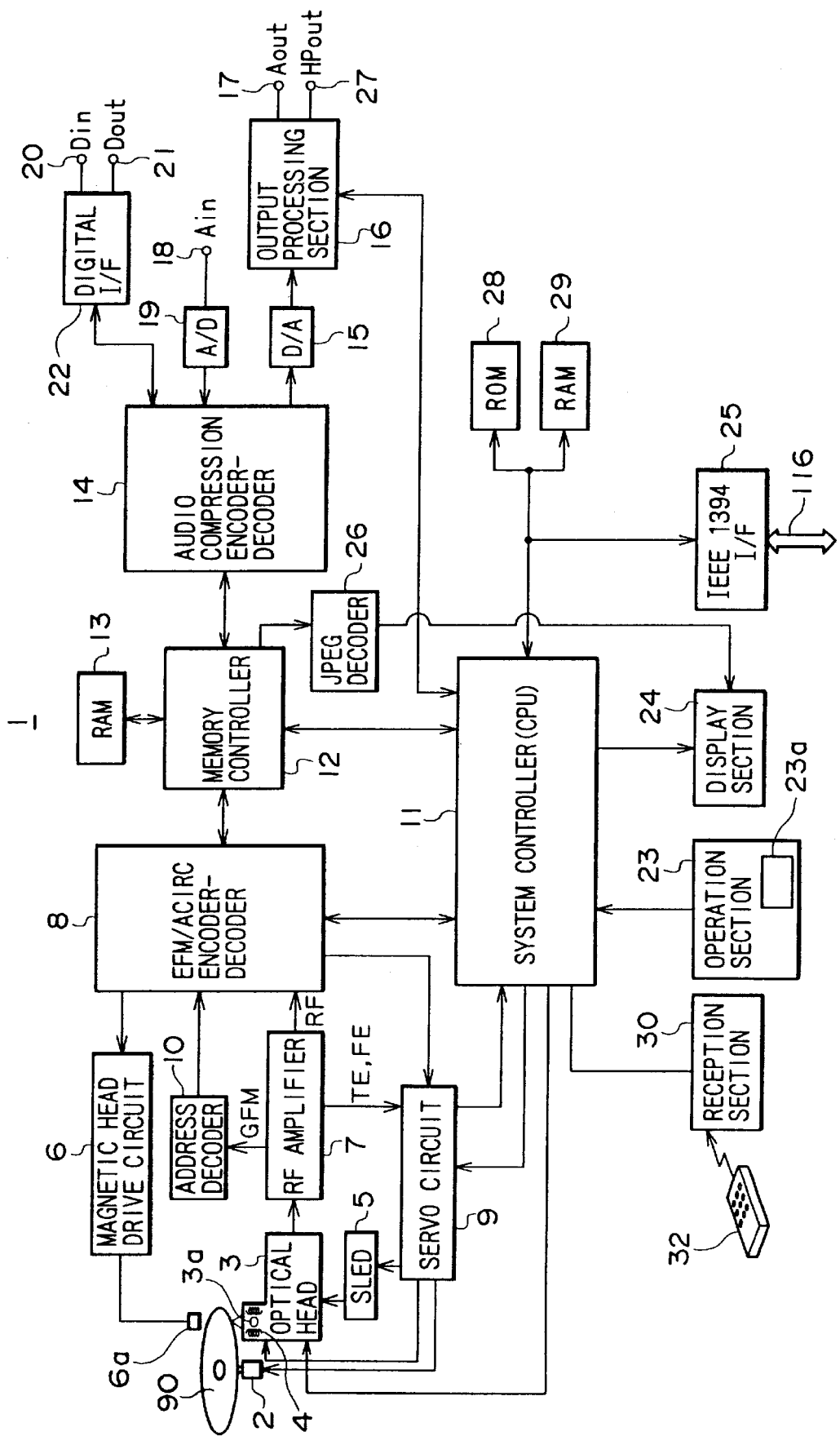
FIG. 1 is a block diagram of a magneto-optical disc recording and reproduction apparatus to which the present invention is applied.

1. Construction of the Recording and Reproduction apparatus
2. Sector Format and Address Format
3. Area Structure
4. IEEE 1394 Format
4-1. Outline
4-2. Stack Model
4-3. Signal Transmission Form
4-4. Bus Connection between Apparatus
4-5. Packet
4-6. CIP (Common Isochronous Packet)
4-7. Connection Management
5. Input Source Selection of the MD Recorder/Player
5-2. Example of the System
5-3. Outline of Input Source Selection Operation
5-4. Processing operation 1. Construction of the Recording and Reproduction Apparatus FIG. 1 shows an internal construction of the recording and reproduction apparatus of the present embodiment. It is to be noted that the recording and reproduction apparatus of the present invention may be hereinafter referred to as MD recorder/player 1.

Referring to FIG. 1, a magneto-optical disc (mini disc) 90 onto which audio data are to be recorded is driven to rotate by a spindle motor 2. Upon recording and reproduction, a laser beam from an optical head 3 is irradiated upon the magneto-optical disc 90. In the present embodiment, a mini disc is used for the magneto-optical disc 90.

Upon recording, the optical head 3 outputs a laser beam of a high level for heating a recording track to a Curie temperature, but upon reproduction, the optical head 3 outputs a laser beam of a comparatively low level for detecting data from reflected light from the magneto-optical disc 90 by a magnetic Kerr effect.

To this end, the optical head 3 includes an optical system which in turn includes a laser diode serving as laser outputting means, a polarizing beam splitter, an objective lens 3a and so forth, a detector for detecting reflected light, and other necessary elements. The objective lens 3a is supported for displacement in a radial direction of and in a direction toward or away from the magneto-optical disc 90 by a biaxial mechanism 4.

A magnetic head 6a is disposed in an opposing relationship to the optical head 3 across the disc 90. The magnetic head 6a is adapted to apply to the magneto-optical disc 90 a magnetic field modulated with data supplied thereto.

The entire optical head 3 and the magnetic head 6a are supported for movement in a radial direction of the disc 90 by a sled mechanism 5.

Information detected from the disc 90 by the optical head 3 upon reproduction is supplied to a RF amplifier 7. The RF amplifier 7 performs arithmetic processing for the information supplied thereto to detect a reproduction RF signal, a tracking error signal TE, a focusing error signal FE, groove information GFM and other necessary information. The groove information is absolute position information recorded as pre-grooves (wobbling grooves) on the magneto-optical disc 90.

The extracted reproduction RF signal is supplied to an encoder and decoder 8. The tracking error signal TE and the focusing error signal FE are supplied to a servo circuit 9, and the groove information GFM is supplied to an address decoder 10.

The servo circuit 9 generates various servo driving signals based on the tracking error signal TE and the focusing error signal FE supplied thereto from the RF amplifier 7, a track jump instruction or an access instruction from a system controller 11, which is formed from a microcomputer, rotational speed detection information of the spindle motor 2, and so forth to control the biaxial mechanism 4 and the sled mechanism 5 to effect focusing and tracking sled control and control the spindle motor 2 to rotate at a constant linear velocity (CLV).

The address decoder 10 decodes the groove information GFM supplied thereto from the RF amplifier 7 to extract address information. The address information is recorded in advance on the magneto-optical disc 90. The extracted addressed information is supplied to the system controller 11 and used for various controlling operations by the system controller 11.

The reproduction RF signal is subject to decoding processing such as EFD (Eight to Fourteen Demodulation) and ACIRC (Advanced Cross Interleave Reed Solomon Coding) in the EFM/ACRIC encoder and decoder 8. Upon such decoding processing, also an address, sub code data and so forth are extracted and supplied to the system controller 11.

Audio data obtained by the decoding processing such as EFM demodulation and ACIRC by the EFM/ACIRC encoder and decoder 8 are written once into a buffer memory RAM 13 by a memory controller 12. It is to be noted that reading of data from the disc 90 by the optical head 3 and transfer of reproduction data in a system from the optical head 3 to the buffer memory RAM 13 are usually performed intermittently at the rate of 1.41 Mbit/sec.

The data written in the buffer memory RAM 13 are read out at a timing at which transfer of the reproduction data is performed at the rate of 0.3 Mbit/sec, and are supplied to an audio compression encoder and decoder 14. The data supplied to the audio compression encoder and decoder 14 are subject to reproduction signal processing such as decoding processing corresponding to audio compression processing so that they are converted into a digital audio signal sampled with 44.1 KHz and quantized with 16 bits.

The digital audio signal is converted into an analog signal by a D/A converter 15 and then subject to level adjustment, impedance adjustment and so forth by an output processing section 16. A resulting signal from the output processing section 16 is outputted as an analog audio signal Aout from a line output terminal 17 to an external apparatus. The signal from the output processing section 16 is supplied also as a headphone output HPout to a headphone output terminal 27 so that it is outputted to a headphone connected to the headphone output terminal 27.

Meanwhile, the digital audio signal after decoded by the audio compression encoder and decoder 14 is supplied to a digital interface 22 so that it can be outputted as a digital audio signal Dout from a digital output terminal 21 to an external apparatus. The digital audio signal is outputted to the external apparatus, for example, by transmission over an optical cable.

It is to be noted that, while the standard to be applied to the digital interface 22 is not particularly limited, the IEC (International Electrotechnical Commission) 958 which is an optical transmission system of one of digital audio interface standards is adopted here.

When a recording operation onto the magneto-optical disc 90 is to be performed, an analog audio signal Ain supplied to a line input terminal 18 is converted into a digital audio signal by an A/D converter 19 and then supplied to the audio compression encoder and decoder 14, by which audio compression encoding is performed therefor.

On the other hand, if a digital audio signal Din is supplied from an external apparatus to a digital input terminal 20, then extraction of control codes and so forth is performed by the digital interface 22. The digital audio signal is supplied to the audio compression encoder and decoder 14, by which audio compression encoding processing is performed therefor.

Though not shown, it is naturally possible to provide a microphone input terminal so that a microphone input may be used as a recording signal.

The compressed digital audio signal from the audio compression encoder and decoder 14 is written once into and accumulated in the buffer memory RAM 13 by the memory controller 12 and then read out for each data unit of a predetermined amount and sent to the EFM/ACIRC encoder and decoder 8. Then, the digital audio signal is subject to encoding processing such as ACIRC encoding and EFM modulation by the EFM/ACIRC encoder and decoder 8, and a resulting signal is supplied to a magnetic head drive circuit 6.

The magnetic head drive circuit 6 supplies a magnetic head driving signal to the magnetic head 6a in accordance with the encoded recording data from the EFM/ACIRC encoder and decoder 8. In other words, the magnetic head drive circuit 6 causes the magnetic head 6a to perform application of a magnetic field of the N or S pole to the magneto-optical disc 90. Further, the system controller 11 thereupon supplies a control signal to the optical head 3 so that the optical head 3 may output a laser beam of a recording level.

An operation section 23 is operated by a user and includes operation keys and an operation element in the form of a JOG dial. The operation elements include, for example, operation elements regarding recording and reproduction operations such as reproduction, recording, pause, stop, FF (fast feeding), REW (rewinding) and AMS (Auto Music Sensor), operation elements regarding play modes such as normal reproduction, program reproduction and shuffle reproduction, an operation element for a display mode operation for switching the displaying state of a display section 24, and operation elements for program editing operations such as track division, track connection, track erasure, track name inputting and disc name inputting.

Further, as an operation element relating to the present embodiment, the operation section 23 includes an input selection key 23a. The input selection key 23a is used to select one of external input sources to the MD recorder/player 1 in such a manner as hereinafter described.

Operation information by the operation keys and the dial is supplied to the system controller 11. The system controller 11 thus executes operation control based on the control information.

The MD recorder/player 1 of the present embodiment further includes a reception section 30. The reception section 30 receives a command signal, for example, of ultraviolet rays transmitted from a remote controller 32, decodes the command signal into a command code (operation information) and outputs the operation information to the system controller 11. Also the operation information outputted from the reception section 30 is used by the system controller 11 to execute operation control.

A displaying operation of the display section 24 is controlled by the system controller 11.

In particular, in order to cause the display section 24 to perform a displaying operation, the system controller 11 transmits data to be displayed to a display driver not shown in the display section 24. The display driver drives a displaying operation of a display unit such as a liquid crystal panel based on the data supplied thereto to display required numerals, characters, symbols and so forth.

The display section 24 displays an operation mode state of a disc being recorded or reproduced, a track number, a recording time or reproduction time, an editing operation state and so forth.

The disc 90 allows recording thereon of character information such as the name of music, an album title, the name of a player and so forth which are managed incidentally to a program as main data. When such character information is inputted, the display section 24 displays the inputted characters. Also, the display section 24 displays character information read out from the disc.

Further, in the present embodiment, auxiliary data (hereinafter referred to as AUX data) which are sub data independent of main data can be recorded on the disc 90.

Information of characters, a still picture or the like can be recorded as the AUX data on the disc 90, and such characters or still picture can be displayed on the display section 24.

In the present embodiment, a JPEG decoder 26 is provided as a component for allowing the display section 24 to display a still picture and characters of AUX data.

In particular, in the present embodiment, still picture data of a data file as AUX data are recorded in the form of a file compressed in accordance with the JPEG (Joint Photographic Coding Experts Group) system. The JPEG decoder 26 receives a file of still picture data reproduced from the disc 90 and stored, for example, in the buffer memory RAM 13 through the memory controller 12, performs decompression processing in accordance with the JPEG system for the file, and outputs resulting data to the display section 24. Consequently, the still picture data as the AUX data are displayed on the display section 24.

It is to be noted, however, that, where character information or still picture information of AUX data is outputted, a full dot display unit or a CRT display unit which has a comparatively large screen and can use the screen freely to some degree is preferably used frequently. Therefore, it is a possible idea to display AUX data on an external monitor apparatus or the like which is connected to an IEEE 1394 interface 25.

Further, while a user can record an AUX data file onto the disc 90, it is sometimes necessary to use an image scanner, a personal computer or a keyboard as an inputting apparatus then, and it is a possible idea to input information as an AUX data file from such an inputting apparatus as just mentioned to the MD recorder/player 1 through the interface 25.

It is to be noted that, in the present embodiment, an IEEE 1394 interface is adopted for the interface 25. Therefore, in the following description, the interface 25 may sometimes be referred to as IEEE 1394 interface 25. The IEEE 1394 interface 25 is connected to various external apparatus over an IEEE 1394 bus 116.

The system controller 11 is formed as a microcomputer including a CPU, an internal interface unit and so forth and controls the various operations described hereinabove.

A program for realizing various operations of the recording and reproduction apparatus and so forth are stored in a program ROM 28, and data, a program and so forth necessary for the system controller 11 to execute various processing are suitably stored into a work RAM 29.

When a recording or reproduction operation is performed for the disc 90, management information recorded on the disc 90, that is, the P-TOC (pre-mastered TOC) and the U-TOC (user TOC) must be read out. The system controller 11 discriminates an address of an area to be recorded or an address of an area to be reproduced on the disc 90 based on the management information.

The management information is stored in the buffer memory RAM 13.

When the disc 90 is loaded into the MD recorder/player 1, the system controller 11 causes a reproduction operation of the innermost circumference of the disc 90, on which the management information is recorded, to be executed to read out the management information and stores the management information into the buffer memory RAM 13 so that the management information may thereafter be referred to upon recording, reproduction or editing operation of a program for the disc 90.

The U-TOC is rewritten in response to recording or editing processing of program data. More particularly, each time a recording or editing operation is performed, the system controller 11 performs U-TOC updating processing for the U-TOC information stored in the buffer memory RAM 13 and rewrites the U-TOC area of the disc 90 at a predetermined timing in response to the rewriting operation.

While AUX data files are recorded on the disc 90 separately from programs, an AUX-TOC is formed on the magneto-optical disc 90 for allowing management of the AUX data files.

The system controller 11 performs also reading out of the AUX-TOC upon reading out of the U-TOC and stores the AUX-TOC into the buffer memory RAM 13 so that, when necessary, it can refer to the AUX data management state.

Further, the system controller 11 reads in an AUX data file upon reading out of the AUX-TOC or at a predetermined timing and stores the AUX data file into the buffer memory RAM 13. Then, in response to an outputting timing which is managed with the AUX-TOC, the system controller 11 causes the display section 24 or the external apparatus connected to the IEEE 1394 interface 25 to execute an outputting operation of characters or an image.

2. Sector Format and Address Format

Data units called sector and cluster are described below with reference to FIGS. 2A to 2E.

In a recording track in the mini disc system, clusters CL are formed successively as seen in FIG. 2A, and one cluster makes a minimum unit upon recording. One cluster corresponds to 2 to 3 circumferential tracks.

Referring to FIG. 2B, one cluster CL includes a linking area of four sectors SFC to SFF and a main data area of 32 sectors S00 to S1F.

As seen from FIG. 2C, one sector is a unit of data including 2,352 bytes.

Of the sub data area of four sectors shown in FIG. 2B, the sector SFF is used as a sub data sector which can be used for recording of information as sub data. However, the remaining three sectors SFC to SFE are not used for recording of data.

Meanwhile, TOC data, audio data, AUX data and so forth are recorded into the main data area for 32 sectors.

It is to be noted that an address is recorded for each one sector.

Referring to FIGS. 2C and 2D, one sector is further divided into units called sound groups. More particularly, two sectors are divided into 11 sound groups.

One sound group is formed from 424 bytes and includes an amount of audio data corresponding to the time of 11.61 msec.

As seen from FIGS. 2D and 2E, data are recorded separately for the left channel and the right channel in one sound group SG. For example, the sound group SG00 includes left channel data L0 and right channel data R0, and the sound group SG01 includes left channel data L1 and right channel data R1.

It is to be noted that 212 bytes which make a data area for the left channel or the right channel is called sound frame.

3. Area Structure

An area structure of the disc 90 in the present embodiment is described below with reference to FIGS. 3A and 3B.

FIG. 3A shows different areas from the innermost circumference side to the outermost circumference side of the disc 90.

The disc 90 as a magneto-optical disc has, on the innermost circumference side, a pit area in which read only data in the form of embossed pits are formed and the P-TOC is recorded.

The remaining area on the outer circumferences with respect to the pit area is formed as a magneto-optical area and as a recording/reproduction allowing area in which grooves as guide grooves for recording tracks are formed.

A section of the magneto-optical area from the cluster 0 on the innermost circumference side to the cluster 49 is used as a management area whereas another section from the cluster 50 to the cluster 2,251 is used as a program area in which actual programs such as music data are recorded. The remaining outer circumferential area with respect to the program area is used as a lead-out area.

The management area is illustrated more particularly in FIG. 3B. FIG. 3B shows sectors in a horizontal direction and shows clusters in a vertical direction.

The clusters 0 and 1 in the management area form a buffer area to the pit area. The cluster 2 is used as a power calibration area PCA and used for output power adjustment of a laser beam and so forth.

In the clusters 3, 4 and 5, the U-TOC is recorded. While contents of the U-TOC are hereinafter described, a data format is defined in each sector in one cluster, and predetermined management information is recorded in each sector. The U-TOC data are repetitively recorded three times in the three clusters 3, 4 and 5 having the sectors in which the U-TOC data are recorded.

The clusters 6, 7 and 8 are used to record the AUX-TOC. Although also contents of the AUX-TOC are omitted herein, a data format is defined in each sector in one cluster and predetermined management information is recorded in each sector. The AUX-TOC data are repetitively recorded three times in the three clusters 6, 7 and 8 having the sectors in which the AUX-TOC data are recorded.

The area from the cluster 9 to the cluster 46 is If used to record AUX data. A data file as AUX data is formed in a unit of a sector and includes picture file sectors as a still picture file, text file sectors as a character information file, karaoke text file sectors as a character information file synchronized with a program and so forth which are hereinafter described.

Data files of AUX data, an area in which AUX data files can be recorded in the AUX data area, and so forth are managed with the AUX-TOC.

It is to be noted that the recording capacity for data files in the AUX data area is 2.8 Mbytes where an error correction system mode 2 is presumed.

Also it is possible to form a second AUX data area, for example, in a rear half portion of the program area or an area on the outer circumference side than the program area such as, for example, the lead-out portion to increase the recording capacity for data files.

The clusters 47, 48 and 49 are used as a buffer area to the program area.

In the program area beginning with the cluster 50 (=32h), audio data of one or a plurality of tunes or the like are recorded in the form compressed by a compression system called ATRAC (Adaptive TRansform Acoustic Coding).

Programs recorded and a recording allowing area are managed with the U-TOC.

It is to be noted that, in each cluster in the program area, the sector FFh can be used for recording of some information as sub data as described hereinabove.

It is to be noted that, although, in the present mini disc system, a reproduction only disc on which programs and so forth are recorded as reproduction only data in the form of pits can be used, the entire area of the reproduction only disc is formed as a pit area. The programs recorded on the reproduction only disc are managed in a manner substantially similar to that with the U-TOC, which is hereinafter described, and the U-TOC is not formed.

However, where reproduction only data files are recorded as AUX data, the AUX-TOC for managing the files is recorded.

4. IEEE 1394 Format 4-1. Outline

The MD recorder/player 1 of the present embodiment is constructed for data communication with other external apparatus through the IEEE 1394 data interface as described hereinabove with reference to FIG. 1. Consequently, the MD recorder/player 1 of the present embodiment can transmit audio data and an AUX data file reproduced thereby over the IEEE 1394 bus so that, for example, another AV apparatus or a personal computer which receives the audio data and AUX data file may display or output sound of the audio data or the AUX data file. The MD recorder/play 1 can also record audio data or an AUX data file received over the IEEE 1394 bus onto a disc. Further, it is possible to perform required operation control of the mini disc recorder/player 1 regarding recording/reproduction, editing processing and so forth using, for example, a personal computer or some other AV apparatus.

Data transmission systems according to the IEEE 1394 are divided into an Isochronous communication system wherein communication is performed periodically and an Asynchronous communication system wherein communication is performed asynchronously irrespective of a period. Generally, the Isochronous communication system is used for transmission/reception of data while the Asynchronous communication system is used for transmission/reception of various control commands and responses. Further, a single cable can be used to effect transmission/reception according to the two kinds of communication systems.

Here, the audio data are time series data to be outputted as an audio output in accordance with the reproduction time base, and a real time performance is required for the audio data. Further, the audio data are greater in data amount when compared with the AUX data.

On the other hand, the amount of the AUX data is not so great as that of the audio data, and although the AUX data are sometimes reproduced in synchronism with reproduction of audio data, such real time performance as is required for the audio data is not strictly required for the AUX data.

Therefore, the transmission form by the IEEE 1394 interface in the present embodiment is generally prescribed such that, upon transmission/reception of the audio data and AUX data described above over the IEEE 1394 bus, the audio data are transmitted/received in accordance with the Isochronous communication system and the AUX data are transmitted/ received in accordance with the Asynchronous communication system.

In the present embodiment, it is possible to transmit audio data and AUX data in opportunities different from each other. Further, as hereinafter described, it is also possible to transmit audio data and AUX data apparently simultaneously by transmitting them in time division in an Isochronous cycle using the IEEE 1394 interface.

Thus, an outline of the IEEE 1394 format which is used in the present embodiment is described below on the assumption of the transmission form according to the IEEE 1394 data interface described above.

4-2. Stack Model

Figure 4:
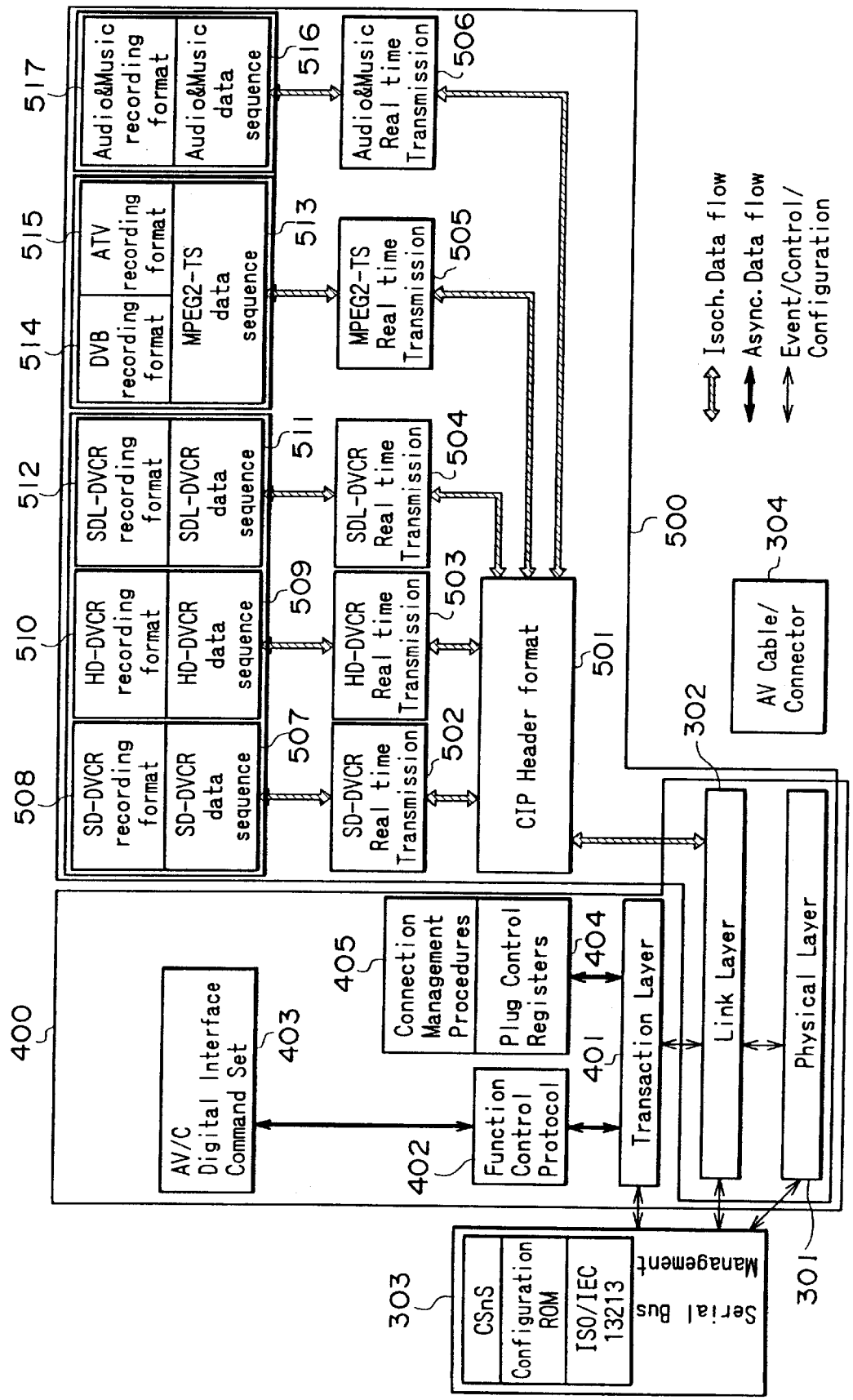
FIG. 4 is a block diagram showing a stack model applied to the IEEE 1394.

FIG. 4 shows a stack model of the IEEE 1394 used in the present embodiment.

In the IEEE 1394 format, the stack model is roughly divided into two systems including an Asynchronous system 400 and an Isochronous system 500.

As layers common to the Asynchronous system 400 and the Isochronous system 500, a Physical Layer 301 is provided on the lowest, and a Link Layer 302 is provided on the Physical Layer 301. The Physical Layer 301 is a layer for controlling hardware signal transmission, and the Link Layer 302 is a layer having a function for converting the IEEE 1394 bus, for example, into an internal bus prescribed for each apparatus.

The Physical Layer 301, the Link Layer 302 and a Transaction Layer 401 which is described below are linked to a Serial Bus Management 303 by a line of Event/Control/ Configuration.

An AV Cable/Connector 304 indicates a physical connector and a cable for AV (Audio/Visual) data transmission.

The Transaction Layer 401 is provided as an upper layer on the Link Layer 302 in the Asynchronous system 400. The Transaction Layer 401 is a layer which prescribes a data transmission protocol of the IEEE 1394. As basic Synchronous Transactions, a Write Transaction, a Read Transaction and a Lock Transaction are prescribed.

An FCP (Function Control Protocol) 402 is prescribed as an upper layer to the Transaction Layer 401. The FCP 402 utilizes a control command prescribed as an AV/C Command (AV/C Digital Interface Command Set) 403 so that it can execute command control for various AV apparatus.

As an upper layer to the Transaction Layer 401, Plug Control Registers 404 for setting a Plug indicative of a logical apparatus connection relationship of the IEEE 1394, which is hereinafter described, making use of Connection Management Procedures 405.

A CIP (Common Isochronous Packet) Header Format 501 is prescribed as an upper layer to the Link Layer 302 of the Isochronous system 500, and such transmission protocols as an SD-DVCR (Standard Density-DVCR) Real time Transmission 502, an HD-DVCR (Hi Density-DVCR) Real time Transmission 503, an SDL-DVCR (Standard Density Long-DVCR) Real time Transmission 504, an MPEG2-TS (MPEG2-Transport Stream) Real time Transmission 505 and an Audio and Music Real time Transmission 506 are prescribed in such a form that they are managed by the CIP Header Format 501.

The SD-DVCR Real time Transmission 502, HD-DVCR Real time Transmission 503 and SDL-DVCR Real time Transmission 504 are data transmission protocols for a digital VTR (Video Tape Recorder).

Data handled by the SD-DVCR Real time Transmission 502 are an SD-DVCR data sequence 507 which is a data sequence obtained in accordance with prescriptions of an SD-DVCR recording format 508.

The data handled by the HD-DVCR Real time Transmission 503 are an SD-DVCR data sequence 509 which is a data sequence obtained in accordance with prescriptions of an HD-DVCR recording format 510.

The data handled by the SDL-DVCR Real time Transmission 504 are an SD-DVCR data sequence 511 which is a data sequence obtained in accordance with prescriptions of an SDL-DVCR recording format 512.

The MPEG2-TS Real time Transmission 505 is a transmission protocol for a tuner, for example, for digital direct broadcasting and so forth, and the data handled by the MPEG2-TS Real time Transmission 505 is an MPEG2-TS data sequence 513 which is obtained in accordance with prescriptions of a DVB (Digital Video Broadcast) recording format 514 or an ATV recording format 515.

The Audio and Music Real time Transmission 506 is a transmission protocol for general digital audio apparatus including an MD system, for example, of the present embodiment, and the data handled by the Audio and Music Real time Transmission 506 is an Audio and Music data sequence 516 which is obtained in accordance with prescriptions of an Audio and Music recording format 517.

4-3. Signal Transmission Form

Figure 5:
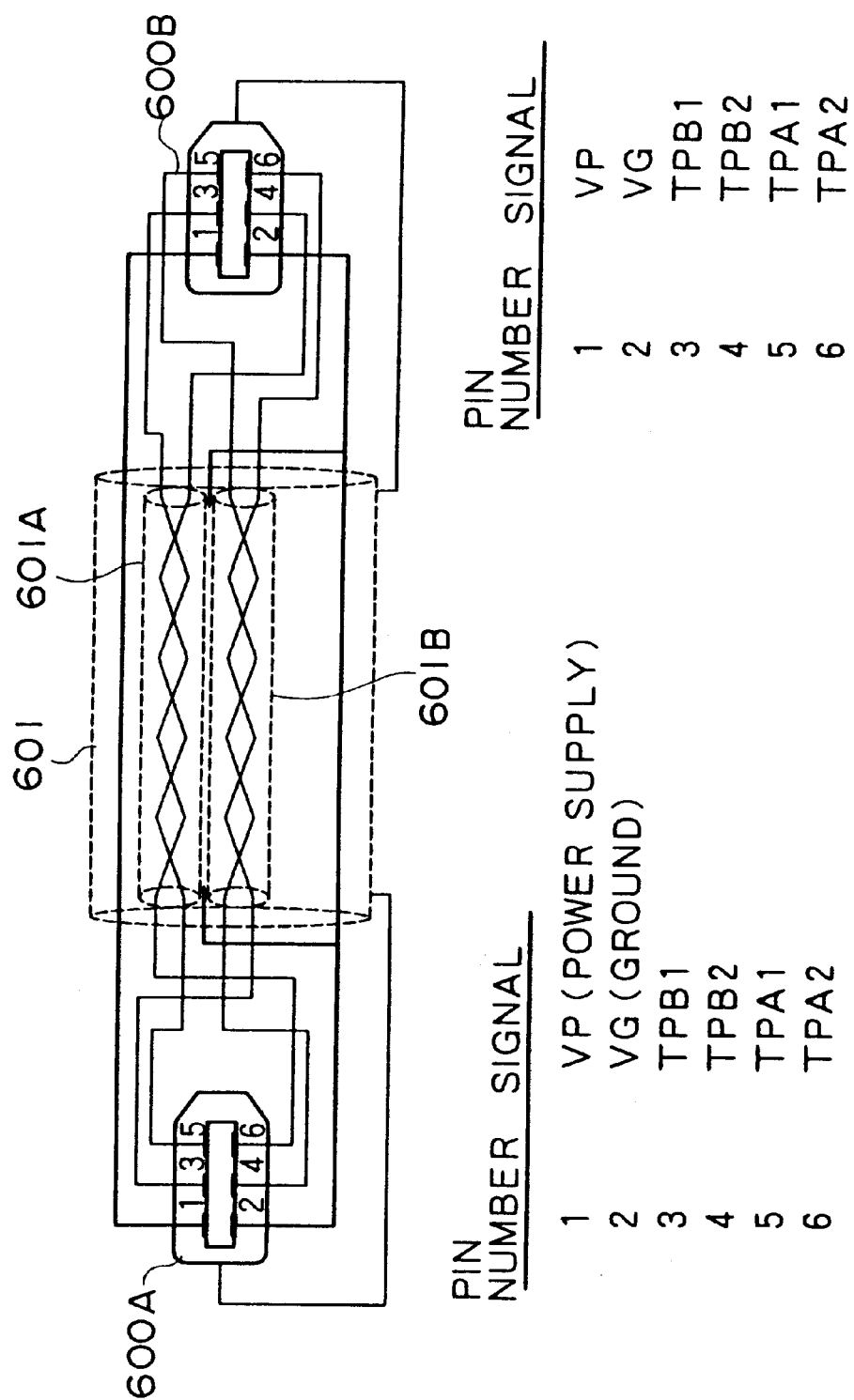
FIG. 5 is a schematic view showing a cable structure of an IEEE 1394 bus.

FIG. 5 shows an example of a structure of a cable used actually as an IEEE 1394 bus.

Referring to FIG. 5, there is shown a structure wherein a pair of connectors 600A and 600B are connected to each other by a cable 601 and six pins having pin numbers 1 to 6 are used as pin terminals of the connectors 600A and 600B.

The pin terminals provided on the connectors 600A and 600B are allocated such that the pin number 1 is for the power supply (VP); the pin number 2 is for the ground (VG); the pin number 3 is for TPB1; the pin number 4 is for TPB2; the pin number 5 is for TPA1; and the pin number 6 is for TPA2.

The connection scheme of the pins between the connectors 600A and 600B is:

Pin number 1 (VP)—pin number 1 (VP)

Pin number 2 (VG)—pin number 2 (VG)

Pin number 3 (TPB1)—pin number 5 (TPA1)

Pin number 4 (TPB2)—pin number 6 (TPA2)

Pin number 5 (TPA1)—pin number 3 (TPB1)

Pin number 6 (TPA2)—pin number 4 (TPB2)

From among the pin connection sets above, the two pin connection sets of twisted lines of Pin number 3 (TPB1)—pin number 5 (TPA1)

Pin number 4 (TPB2)—pin number 6 (TPA2)

form a signal line 601A for differentially transmitting a signal between the connectors 600A and 600B, and the two pin connection sets of twisted lines of Pin number 5 (TPA1)—pin number 3 (TPB1)

Pin number 6 (TPA2)—pin number 4 (TPB2)

form a signal line 601B for differentially transmitting a signal between the connectors 600A and 600B.

Figure 6:
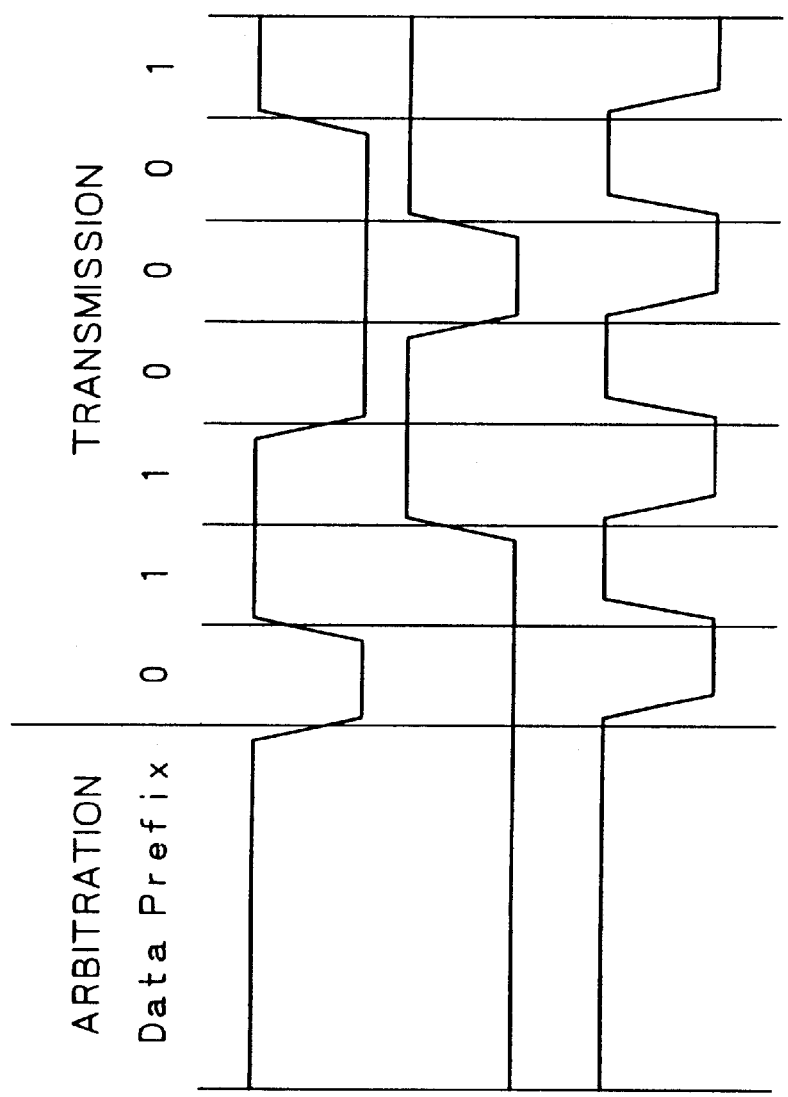
FIG. 6A is a timing chart of a data signal transmitted by the cable shown in FIG. 5.
FIG. 6B is a timing chart of a strobe signal transmitted by the cable shown in FIG. 5.
FIG. 6C is a timing chart of a clock signal transmitted by the cable shown in FIG. 5.

A data signal (Data) illustrated in FIG. 6A and a strobe signal (Strobe) illustrated in FIG. 6B are transmitted over the two signal lines 601A and 601B, respectively.

The data signal illustrated in FIG. 6A is outputted from the pins TPB1 and TPB2 and inputted to the pins TPA1 and TPA2 using one of the signal lines 601A and 601B.

The strobe signal illustrated in FIG. 6B is obtained by performing predetermined logical operation for a data signal and a transmission clock signal synchronized with the data signal and has a frequency lower than an actual transmission clock signal. The strobe signal is outputted from the pins TPA1 and TPA2 to the pins TPB1 and TPB2 using that one of the signal lines 601A and 601B which is not used for transmission of the data signal.

For example, if the data signal and the strobe signal illustrated in FIGS. 6A and 6B are inputted to a certain apparatus which complies with the IEEE 1394, then the apparatus performs predetermined logical operation for the data signal and the strobe signal inputted thereto to produce such a transmission clock signal (Clock) as illustrated in FIG. 6C and utilizes the transmission clock signal for required input data signal processing.

In the IEEE 1394 format, such a hardware data transmission form as described above is adopted to eliminate the necessity for transmission of a transmission clock signal of a high frequency between apparatus by means of a cable to assure a high degree of reliability in signal transmission.

It is to be noted that, while the foregoing description relates to the specification for 6 pins, the IEEE 1394 format allows another specification for 4 pins which eliminates the power supply (VP) and the ground (VG) but includes only the signal lines 601A and 601B as two twisted lines. For example, the MD recorder/player 1 of the present embodiment is constructed taking it into consideration that a simple and easy system to a user can actually be provided by using a cable of the 4-pin specification.

4-4. Bus Connection Between Apparatus

Figure 7:
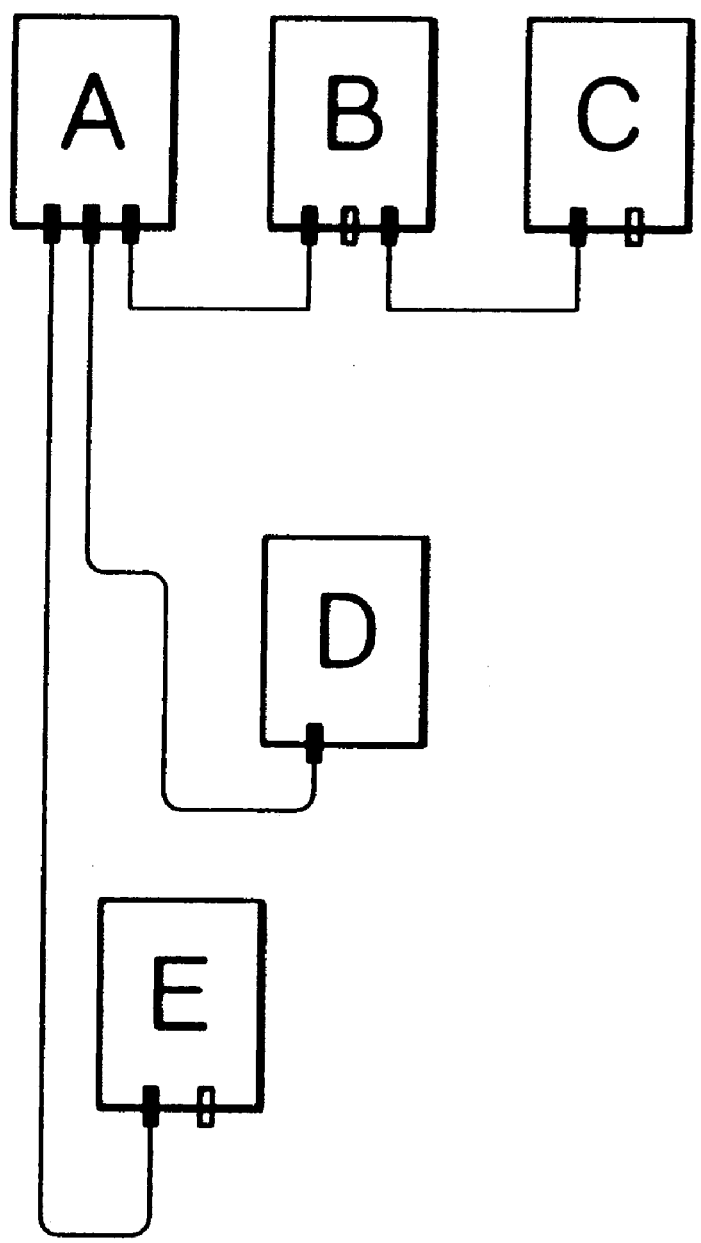
FIG. 7 is a diagrammatic view showing a manner of connection among several apparatus using an IEEE 1394 bus.

FIG. 7 schematically shows an example of a connection among several apparatus by means of the IEEE 1394 bus. In FIG. 7, a system is shown wherein nodes of five apparatus A, B, C, D and E are connected for mutual communication by means of the IEEE 1394 bus.

The IEEE 1394 interface allows so-called "daisy chain connection" wherein apparatus are connected in series like the apparatus A, B and C by means of the IEEE 1394 bus. Further, the IEEE 1394 interface allows a so-called "branch connection" wherein a certain apparatus is connected in parallel to a plurality of apparatus like the connection between the apparatus A and the apparatus B, D and E in the system shown in FIG. 7.

The IEEE 1394 interface allows connection of 63 apparatus in the maximum in the entire system by making use of the branch connection and the daisy chain connection.

However, where only the daisy chain connection is used, connection of up to 16 apparatus in the maximum is allowed. Further, a terminator required by the SCSI is not required by the IEEE 1394 interface.

Further, the IEEE 1394 interface allows mutual communication among apparatus which are connected by the daisy chain connection and/or the branch connection in such a manner as described above. In the system shown in FIG. 7, mutual communication between arbitrary ones of the apparatus A, B, C, D and E is allowed.

In a system wherein a plurality of apparatus are interconnected by means of the IEEE 1394 bus (such a system is hereinafter referred to as IEEE 1394 system), processing for setting a Node ID to be given to each apparatus is performed actually. This processing is schematically illustrated in FIGS. 8A to 8C.

Figure 8:
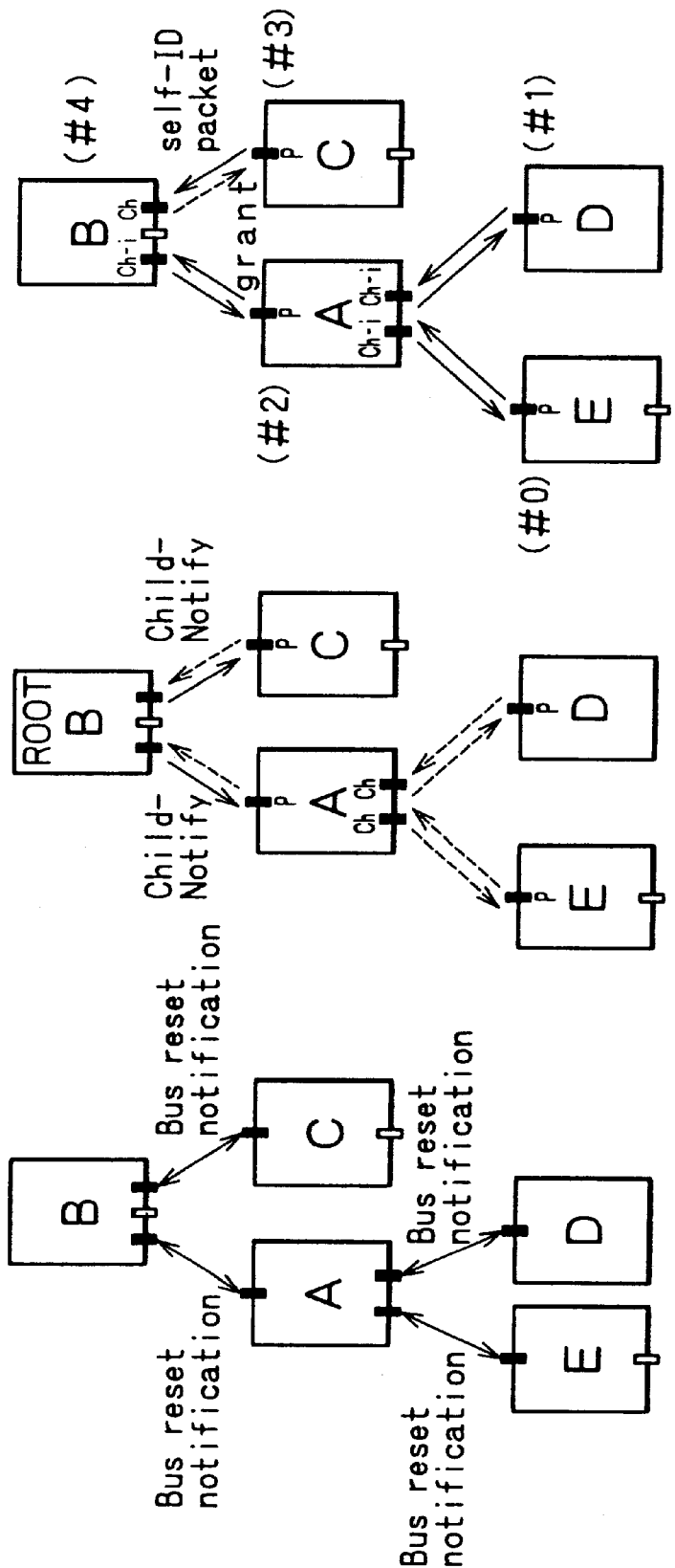
FIG. 8A is a diagrammatic view illustrating a communication condition between different apparatus in an initial state.
FIG. 8B is a similar view but illustrating a communication condition between the different apparatus after bus resetting.
FIG. 8C is a similar view but illustrating a communication condition between the different apparatus after a TREE structure is settled.

If, in an IEEE 1394 system having such a connection scheme as shown in FIG. 8A, connection or disconnection of a cable, an on/off operation of the power supply to a certain apparatus in the system, a spontaneous generation process in a PHY (Physical Layer Protocol) or the like occurs, then a bus reset occurs in the IEEE 1394 system.

In response to the bus reset, processing for notifying all apparatus of the bus reset is executed over the IEEE 1394 bus among the apparatus A, B, C, D and E.

As a result of the bus reset notification, a parentage is defined between each adjacent apparatus terminals by performing communication (Child-Notify) between them as seen from FIG. 8B. In other words, a Tree structure among the apparatus in the IEEE 1394 system is constructed. Then, an apparatus as a root is defined in accordance with a result of the construction of the Tree structure. The root is an apparatus whose terminals are all defined as children (Ch; Child). In the system shown in FIG. 8B, the apparatus B is defined as the root. Conversely speaking, for example, a terminal of the apparatus A which is connected to the apparatus B serving as the root is defined as a parent (P; Parent).

After the Tree structure and the root in the IEEE 1394 system are defined in such a manner as described above, each apparatus outputs a Self-ID packet as a declaration of a Node-ID of the apparatus itself as seen from FIG. 8C. Then, the root successively approves (grants) the Node-IDs to determine the addresses, that is, the Node IDs, of the apparatus in the IEEE 1394 system.

4-5. Packet

Figure 9:
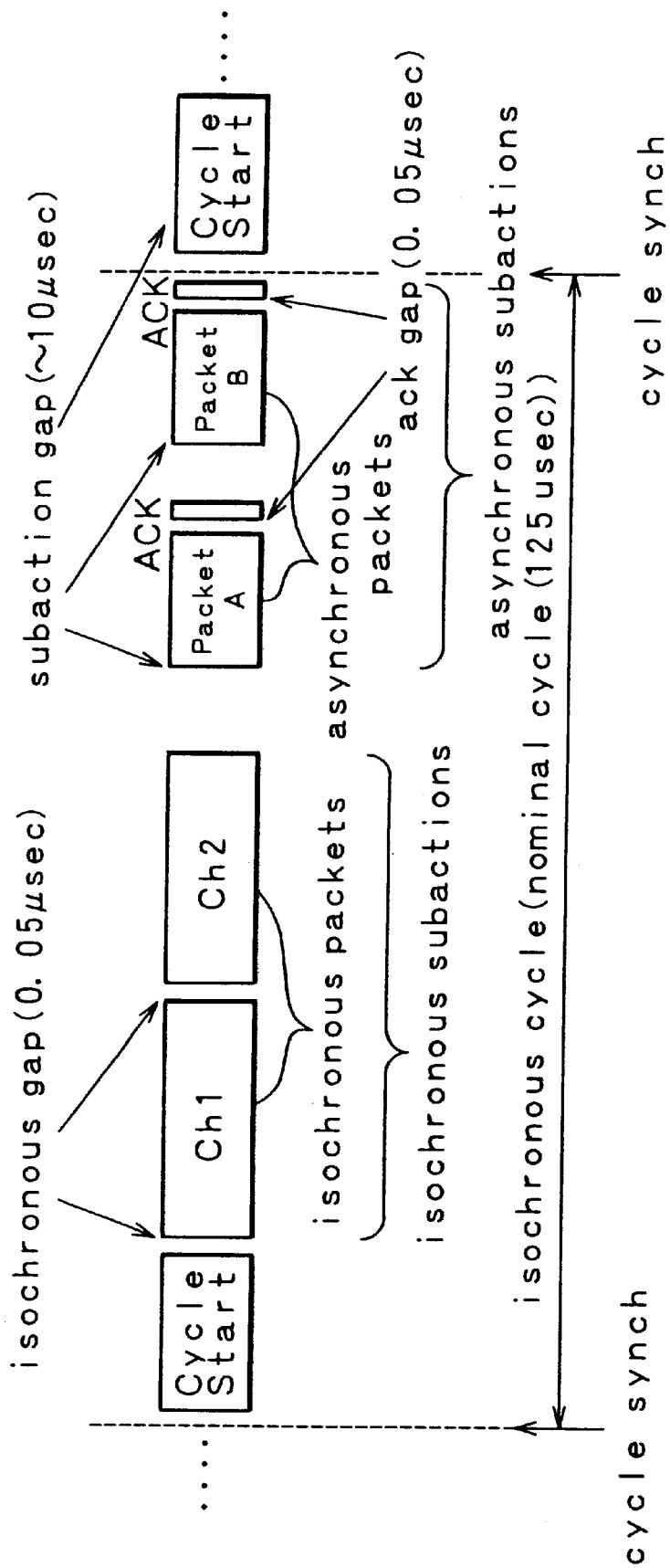
FIG. 9 is a timing chart showing a data structure for a cycle.

According to the IEEE 1394 format, transmission is performed by repeating the period of an Isochronous cycle (nominal cycle) in such a manner as seen in FIG. 9. In this instance, one Isochronous cycle has a time of 125 $\mu$sec. which corresponds to a frequency band of 100 MHz. It is to be noted that the period of the Isochronous cycle is prescribed such that it may have any other value than 125 $\mu$sec. Data are packetized and transmitted for each Isochronous cycle.

As seen from FIG. 9, a Cycle Start Packet indicative of a start of one Isochronous cycle is placed at the top of the Isochronous cycle.

Though detailed description is omitted here, a generation timing of the Cycle Start Packet is indicated by a particular one of the apparatus in the IEEE 1394 system which is defined as Cycle Master.

Next to the Cycle Start Packet, Isochronous Packets are placed preferentially. The Isochronous Packets are produced for the different channels and transferred in a time-division fashion (Isochronous subactions) as seen in FIG. 9. In the Isochronous subactions, a rest period of, for example, 0.05 $\mu$sec called Isochronous gap is provided at a breakpoint of each packet.

In this manner, the IEEE 1394 system allows transmission and reception of Isochronous data in multiple channels using a single transmission line.

The IEEE 1394 format is prescribed such that, in the present situation, 64 channels can be used in the maximum.

Where a case wherein the MD recorder/player of the present embodiment transmits applicable ATRAC data (compressed audio data) in accordance with the Isochronous system is considered, if the ATRAC data are transferred at an ordinary transfer rate of 1.4 Mbps, then a time series real time property is assured if ATRAC data of at least substantially 20 and several Mbytes are transmitted as Isochronous Packets for each period of one Isochronous cycle of 125 $\mu$sec.

For example, when a certain apparatus transmits ATRAC data, although detailed description is omitted here, it requests the IRM (Isochronous Resource Manager) in the IEEE 1394 system for a size of an Isochronous packet with which real time transmission of the ATRAC data can be assured. The IRM supervises the data transmission situation at present and provides permission/non-permission to the certain apparatus. If permission is given, then the certain apparatus can packetize the ATRAC data into an Isochronous Packet and transmit it using a designated channel. This is called band reservation of the IEEE 1394 interface.

Transmission of Asynchronous subactions, that is, transmission of Asynchronous packets, is performed using a remaining band in the band of the Isochronous cycle which is not used by the Isochronous subactions.

In FIG. 9, an example is shown wherein two Asynchronous Packets including a Packet A and a Packet B are transmitted. The Asynchronous Packets are followed by a signal called ACK (Acknowledge) across a rest period of an ack gap (0.05 $\mu$sec). The ACK is a signal outputted from the hardware of the reception side (Target) in order to notify the transmission side (Controller) that some Asynchronous data have been received in a process of an Asynchronous Transaction in such a manner as hereinafter described.

Before and after a data transmission unit which includes an Asynchronous Packet and the ACK following the Asynchronous Packet, a rest period called subaction gap of approximately 10 $\mu$sec is provided.

Here, if ATRAC data are transmitted with an Isochronous packet and an AUX data file incidental to the ATRAC data is transmitted with an Asynchronous Packet, then the ATRAC data and the AUX data file can be transmitted apparently simultaneously.

4-6. CIP

Figure 10:
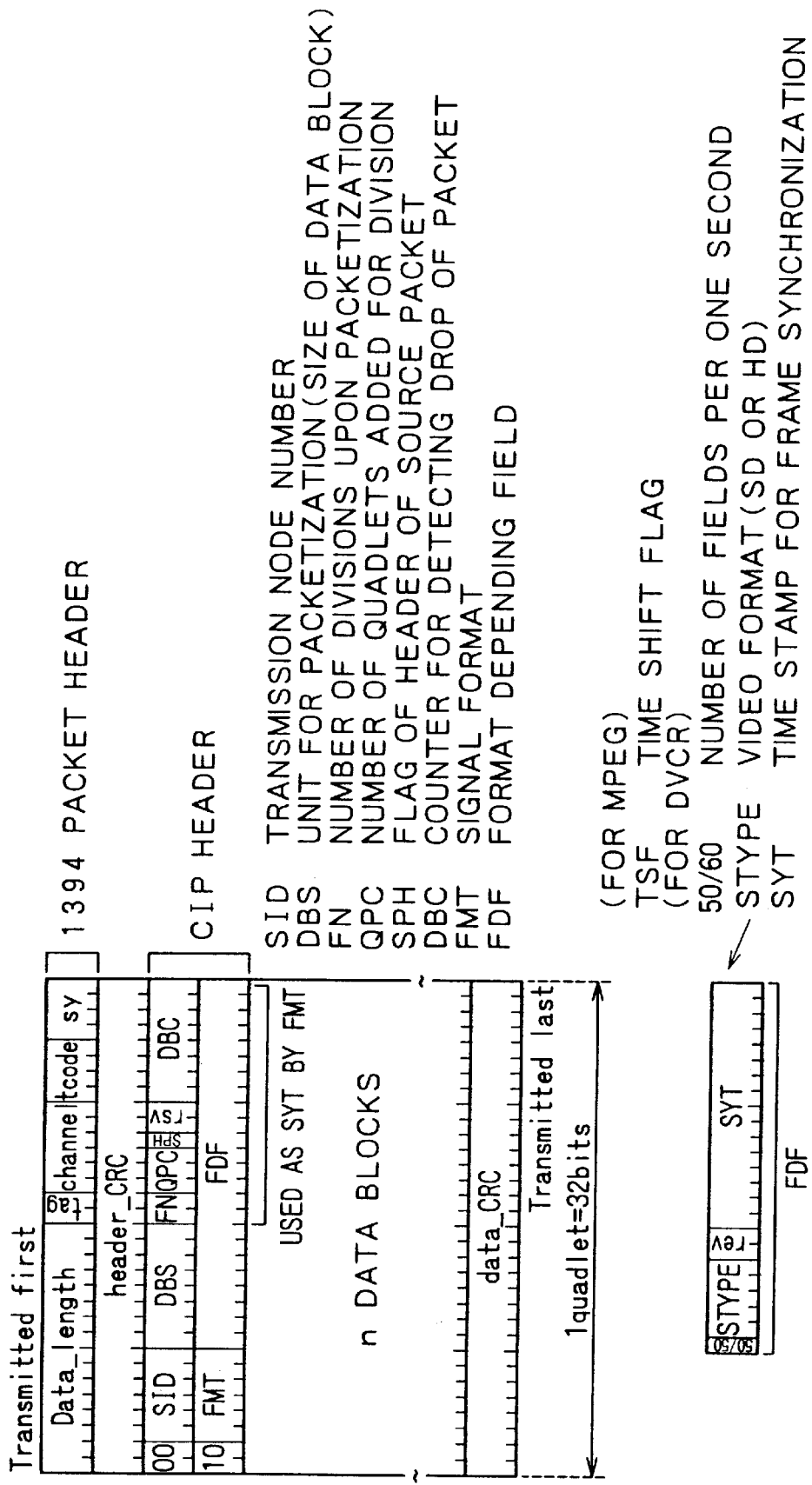
FIG. 10 is a diagrammatic view showing a data structure of a bus address in an IEEE 1394 bus.

FIG. 10 shows a structure of a CIP (Common Isochronous Packet). In particular, a data structure of the Isochronous Packet shown in FIG. 9 is shown.

As described hereinabove, audio data which is one of recording and reproduction data which can be handled by the MD recorder/player of the present embodiment is, in IEEE 1394 communication, transmitted and received by Isochronous communication. In particular, an amount of data with which the real time property is maintained is placed in Isochronous Packets and successively transmitted for each one Isochronous cycle.

The 32 bits (1 quadlet) at the top of the CIP are used as a 1394 packet header.

The area of 16 bits from the top of the 1394 packet header is used for data_Length; the following area of 2 bits is used for tag; the following area of 6 bits is used for channel; the following area of 4 bits is used for tcode; and the following area of 4 bits is used for sy.

The area of one quadlet following the 1394 packet header is used to place header_CRC therein.

The area for channel (6 bits) of the 1394 packet header indicates a channel to be used to transmit the CIP. For example, an apparatus on the reception side can refer to the area for channel of the CIP transmitted thereto from the transmission side to identify a channel used for transmission of the CIP (that is, data transmission by Isochronous communication).

The area of 2 quadlets following the header_CRC is used for a CIP header.

The high order 2 bytes of the high order quadlet of the CIP header have "0", "0" placed therein, and the following area of 6 bits indicates an SID (transmission node number). The area of 8 bits following the SID is used for the DBS (data block size) and indicates the size of a data block (a unit data amount upon packetization). Following the DBS, the areas for FN (2 bits) and QPC (3 bits) are set. The FN indicates a number of divisions upon packetization while the QPC indicates a number of quadlets added for such division.

The SPH (1 bit) indicates a flag of the header of a source packet, and the DBC has placed herein a value of a counter for detecting a drop of a packet.

The high order 2 bytes of the low order quadlet of the CIP header have "1", "0" placed therein. Following this, areas for the FMT (6 bits) and the FDF (24 bits) are provided. The FMT indicates a signal format, and a kind of data (data format) stored in the CPI can be identified from the value indicated in the FMT. More particularly, identification among MPEG stream data, Audio stream data, digital video camera (DV) stream data and other data is allowed. Data formats which can be indicated by the FMT correspond to transmission protocols such as, for example, the SD-DVCR Real time Transmission 502, HD-DVCR Real time Transmission 503, SDL-DVCR Real time Transmission 504, MPEG2-TS Real time Transmission 505 and Audio and Music Real time Transmission 506 managed with the CIP Header Format 501 shown in FIG. 4.

The FDF is a format dependent field and is a field which indicates a further fine classification of the data format classified with the FMT given above. With regard to audio data, the FDF allows identification of, for example, whether it is linear audio data or MIDI data.

For example, with regard to ATRAC data in the present embodiment, the FNT first indicates that it is data which is in the criterion of Audio stream data, and the FDF, in which a particular value in accordance with prescriptions is placed, indicates that the Audio stream data is ATRAC data.

Here, for example, where the FMT indicates the MPEG, synchronous control information called TSF (time shift flag) is placed in the FDF. On the other hand, if the FMT indicates the DVCR (digital video camera), the FDF is defined as indicated at a lower portion of FIG. 10. In particular, from the higher order side, the number of fields for one second is defined by 50/60 (1 bit); it is indicated by the STYPE (5 bits) which one of SD and HD the video format is; and a time stamp for frame synchronization is indicted by the SYT.

Following the CIP header described above, data indicated by the FMT and the FDF are placed in the form of a sequence of n data blocks. Where the FMT and the FDF designate ATRAC data, ATRAC data are stored in the area of the data blocks.

Following the data blocks, data_CRC is disposed at the last.

4-7. Connection Management

In the IEEE 1394 format, a connection relationship between apparatus interconnected by an IEEE 1394 bus is prescribed by a logical connection concept called "plug".

Figure 11:
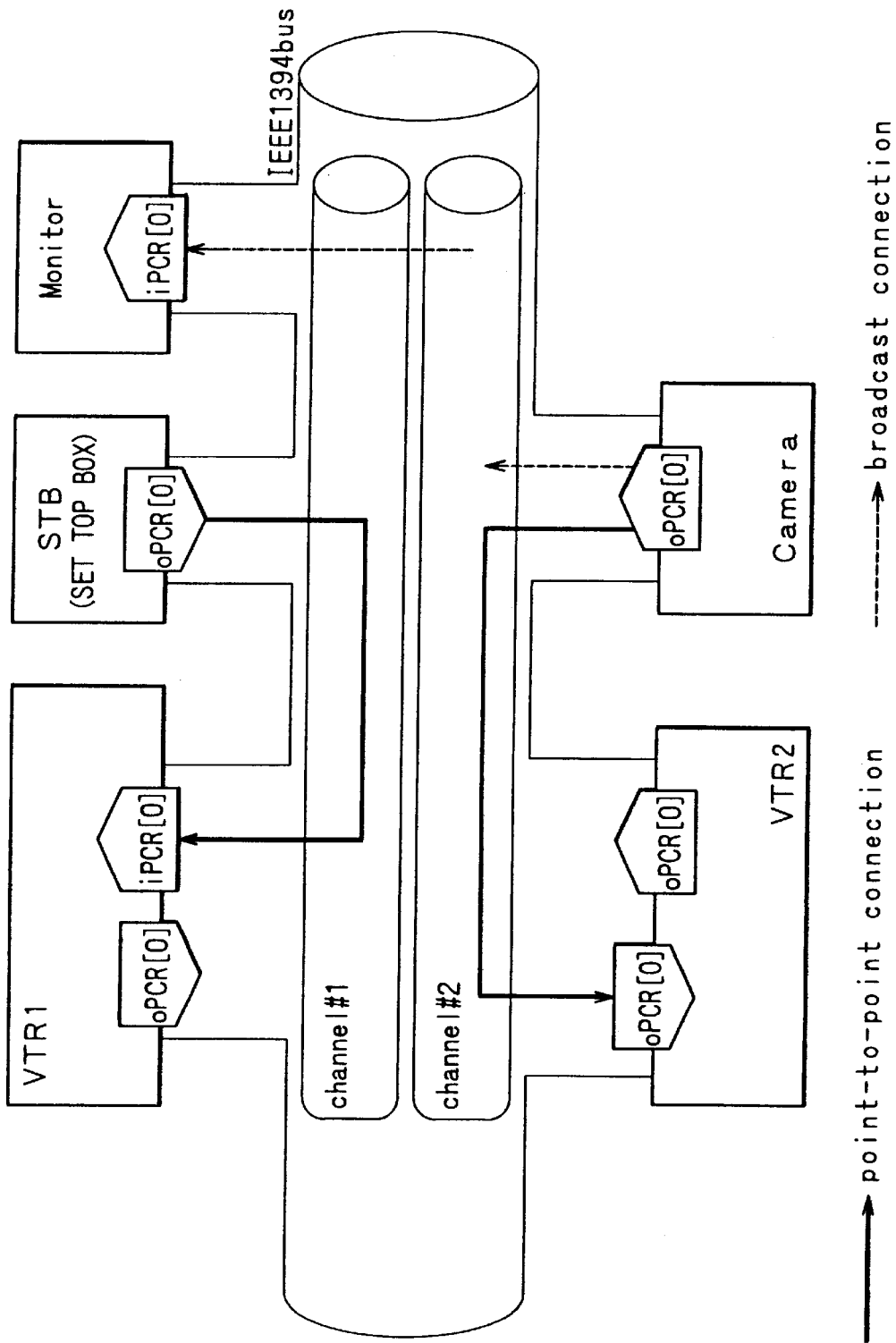
FIG. 11 is a diagrammatic view showing a connection condition prescribed for a plug.

FIG. 11 illustrates an example of a connection relationship prescribed by a plug. More particularly, FIG. 11 shows a system configuration wherein a VTR1, a VTR2, a set top box (STB: digital direct broadcasting tuner), a monitor apparatus (Monitor) and a digital still camera (Camera) are interconnected by an IEEE 1394 bus.

Here, as the connection form of the IEEE 1394 by a plug, two forms of point to point-connection and broadcast connection are available.

The point to point-connection is a form of connection wherein a relationship between a transmission apparatus and a reception apparatus is specified as a plug and data transmission is performed between the transmission apparatus and the reception apparatus using a common channel.

In contrast, the broadcast connection is a form of connection wherein a transmission apparatus transmits without specifying a reception apparatus and a used channel. The receiver side receives the transmitted data without specifically identifying the transmission apparatus and performs, if necessary, required processing in accordance with contents of the received data.

FIG. 11 illustrates the point to point-connection in a state wherein the STB is set as a transmission apparatus and the VTR1 is set as a reception apparatus such that transmission of data is performed using the channel #1 and another state wherein the digital still camera is set as a transmission apparatus and the VTR2 is set as a reception apparatus such that transmission of data is performed using the channel #2.

FIG. 11 illustrates also a further state wherein the digital still camera is set so as to perform data transmission therefrom over the broadcast connection. Here, a case is illustrated wherein the monitor apparatus receives data transmitted over the broadcast connection and performs required response processing.

Such a connection form (plug) as described above is established with a PCR (Plug Control Register) provided in an address space in each apparatus.

Figure 12A:
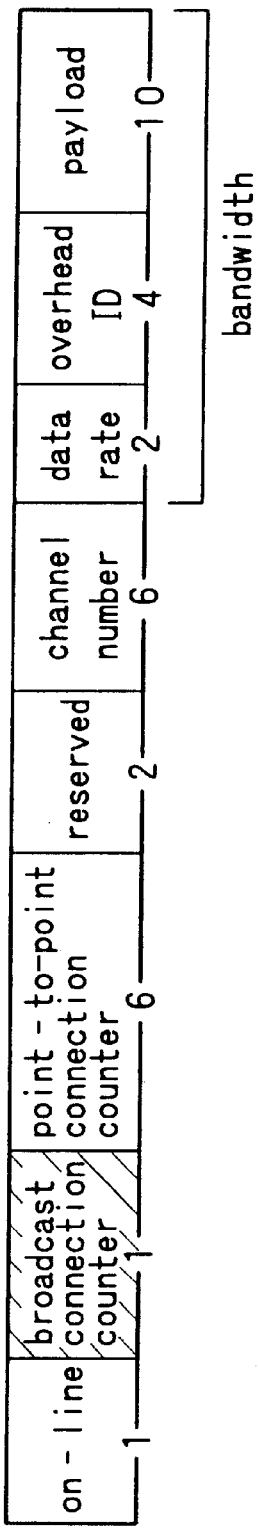
FIG. 12A is a diagrammatic view showing a structure of an outputting plug control register.
Figure 12B:
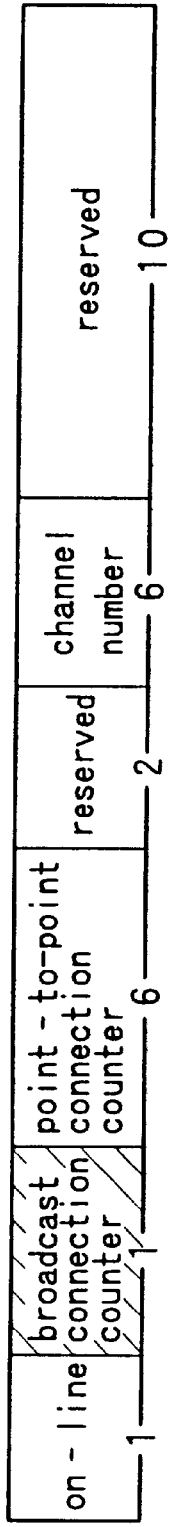
FIG. 12B is a similar view but showing a structure of an inputting plug control register.

FIG. 12A shows a structure of a plug control register oPCR[n] (outputting plug control register), and FIG. 12B shows a structure of another plug control register iPCR[n] (inputting plug control register) The sizes of the plug control registers oPCR[n] and iPCR[n] are both 32 bits.

In the plug control register oPCR of FIG. 12A, for example, where the on-line of the high order 1 bit has "1" placed therein, this indicates transmission over the broadcast connection, but where the on-line has "0" placed therein, this indicates transmission over the point to point connection using a channel indicated by the channel number in the area of 6 bits beginning with the 11th high order bit.

Also in the plug control register iPCR of FIG. 12B, for example, where the on-line of the high order 1 bit has "1" placed therein, this indicates reception over the broadcast connection, but where the on-line has "0" placed therein, this indicates transmission over the point to point connection of data transmitted in a channel indicated by the channel number in the area of 6 bits beginning with the 11th high order bit.

5. Input Source Selection of the MD Recorder/Player
5-1. Example of the System

From the foregoing description, the MD recorder/player 1 of the present embodiment can receive, as an input source thereto, audio data transmitted from some other AV apparatus over the IEEE 1394 bus and record the audio data onto a disc. Further, similarly as in a conventional MD recorder/player, the MD recorder/player 1 can record audio data inputted thereto through the digital interface 22 (IEC 958) or an audio signal inputted thereto through the analog line input terminal 18 and the A/D converter 19.

In short, the MD recorder/player 1 of the present embodiment has three input systems as input sources for recording audio data onto a disc including an analog audio signal inputted from the analog line input terminal 18, audio data inputted from the digital interface 22 (IEC 958) and audio data inputted from the IEEE 1394 interface 25. Accordingly, for example, upon selection of an input source for recording, one of the input systems must be selected.

Further, where audio data inputted through the IEEE 1394 interface 25 are selected, since they are transmitted over a particular one of the 64 channels allocated for use to different apparatus as described hereinabove with reference to FIGS. 9, 11, 12A and 12B, the MD recorder/player 1 must select an external AV apparatus which transmits the audio data as an input source.

Therefore, an operation of the MD recorder/player 1 of the present embodiment when it selects an input source is described below. First, an example of a construction of an AV system which includes the MD recorder/player 1 is described with reference to FIG. 13.

The AV system shown in FIG. 13 includes several AV apparatus interconnected by an IEEE 1394 bus system including several IEEE 1394 buses 116.

The AV apparatus shown in FIG. 13 include a CD player (A) 101, another CD player (B) 102, an IRD 103, a digital video deck 104, a digital video camera 105, and an MD recorder/player 1, which are interconnected for mutual communication over the IEEE 1394 bus system in accordance with the connection rule described hereinabove with reference to FIG. 7.

The CD player (A) 101 and the CD player (B) 102 are audio apparatus for reproducing a CD and output reproduced audio data over the IEEE 1394 bus.

The IRD 103 is a digital direct broadcasting tuner. In digital direct broadcasting in recent years, digital audio data of a tune are broadcast. In the present system, a program which provides such digital audio data can be received by the IRD 103, and the received audio data can be recorded, for example, by the MD recorder/player 1.

The digital video deck 104 is an apparatus which can record and reproduce video data. For example, the digital video deck 104 can receive video data picked up and recorded by the digital video camera 105, record the received video data onto a video tape and perform editing and so forth of the thus recorded contents.

In the arrangement shown in FIG. 13, an audio amplifier 106 is connected to the MD recorder/player 1. The audio amplifier 106 is connected to the line output terminal 17 of the MD recorder/player 1 so that it can receive an audio signal reproduced from a disc by the MD recorder/player 1 or an audio signal inputted as a recording source to the MD recorder/player 1, amplify the received audio signal and output the amplified audio signal as sound from the speaker 107.

While data can actually be communicated between the apparatus which are interconnected by the IEEE 1394 bus, it is assumed that, for the convenience of description, in the AV system shown in FIG. 13, the MD recorder/player 1 is treated as a reception apparatus which can receive audio stream data and record the received audio stream data onto a disc while each of the other apparatus, that is, the CD player (A) 101, CD player (B) 102, IRD 103, digital video deck 104 and digital video camera 105, is treated as a transmission apparatus which can transmit audio stream data or video stream data by Isochronous communication.

Further, it is assumed that channels to be used to transmit stream data by Isochronous communication are allocated in such a manner as seen in FIG. 13 to the transmission apparatus mentioned above. Specifically, it is assumed here that, of the 64 channels ch0 (the 0th channel) to ch63 (the 63rd channel), the channel ch50 (50th channel) is used by the CD player (A) 101, the channel ch30 by the CD player (B) 102, the channel ch10 by the IRD 103, the channel ch0 by the digital video deck 104, and the channel ch63 by the digital video camera 105.

Such allocation designation of the channels is performed by an apparatus set as an IRM (Isochronous Resource Manager) described hereinabove with reference to FIG. 9. For example, several apparatus interconnected by an IEEE 1394 bus perform communication in accordance with a predetermined rule in a required opportunity to determine one of the apparatus as an IRM. Then, the other apparatus communicate with the apparatus determined as the IRM to request for channel allocation, and the IRM performs channel designation in response to a current condition of use of channels.

It is to be noted that the system shown in FIG. 13 may be constructed otherwise such that, though not shown in FIG. 13, it includes apparatus which are connected to the analog line input terminal 18 and the digital interface 22 (IEC 958) of the MD recorder/player 1. Further, various other AV systems may be possible which include the MD recorder/player 1 and employ the IEEE 1394 bus for connection of components.

5-2. Outline of Input Source Selection Operation

Now, operation of the MD recorder/player 1 in the AV system having the construction described above with reference to FIG. 13 when it selects an input source is described with reference to FIG. 14.

Selection of an input source here signifies selection of one of an analog audio signal inputted from the analog line input terminal 18, audio data inputted from the digital interface 22 (IEC 958) and data (channel selection) inputted from the IEEE 1394 interface 25.

It is to be noted that, in the following description, a mode in which an audio signal from the analog line input terminal 18 is selected as an input source is referred to as "analog input mode", another mode in which audio data from the digital interface 22 (IEC 958) is selected is referred to as "digital audio input mode", and a further mode in which data from the IEEE 1394 interface 25 is selected is referred to as "i link input mode".

Further, in the following description given with reference to FIG. 14, it is assumed that the CD player (A) 101 and the CD player (B) 102 which serve as transmission apparatus are outputting or transmitting audio stream data (44.1 KHz, 16 bits) individually reproduced from CDs by Isochronous communication over the channels ch50 and ch30 respectively designated therefor.

Similarly, it is assumed that also the IRD 103 is transmitting digital audio data obtained by reception of a digital audio broadcasting program using the channel ch10.

Further, it is assumed that the digital video deck 104 is transmitting video stream data being currently reproduced using the channel ch0, and the digital video camera 105 is transmitting video stream data, for example, being currently picked up or reproduced using the channel ch63.

Further, in the present embodiment, it is prescribed that, when each of the transmission apparatus outputs or transmits its stream data by Isochronous communication, it transmits the stream data through a broadcast connection. In the present embodiment, the transmission apparatus side performs transmission through a broadcast connection to realize selection of an input source in the i link input mode in the MD recorder/player 1 side which is hereinafter described.

Consequently, the outputting plug control register oPCR of each of the transmission apparatus is set to "1" for on-line in such a manner as described hereinabove with reference to FIG. 12A thereby to indicate transmission through a broadcast connection.

Further, when each of the transmission apparatus transmits stream data using a channel designated therefor, the value of a channel to be used thereby is placed into and transmitted with the area for channel of the 1394 packet header of the CIP shown in FIG. 10.

Selection of an input source by the MD recorder/player 1 is switched in response to an operation of the input selection key 23a.

Figure 14:
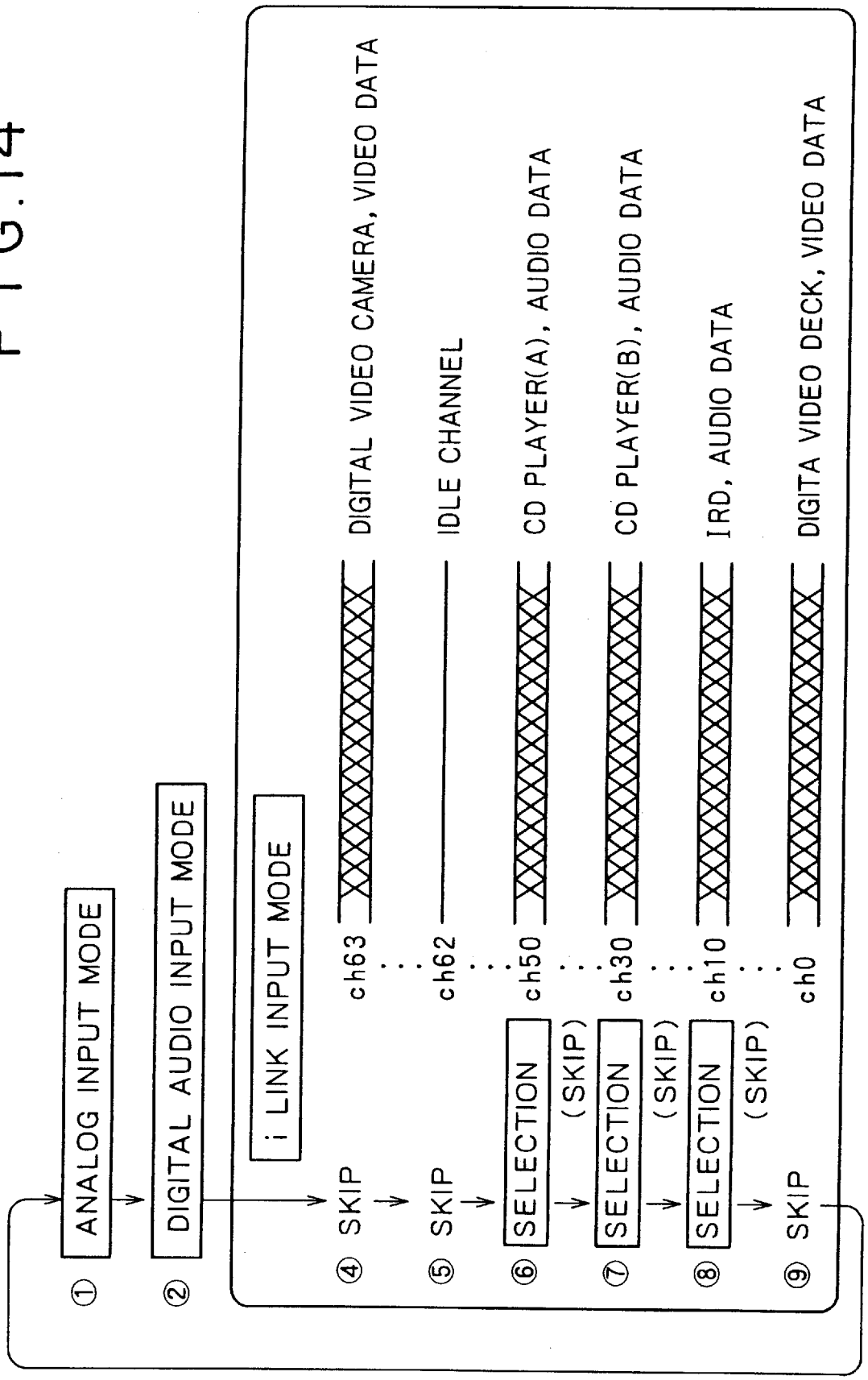
FIG. 14 is a transition diagram illustrating mode switching in response to an input selection key operation by the AV system shown in FIG. 13.

Here, it is assumed that the MD recorder/player 1 is currently in the analog input mode as indicated as stage ① in FIG. 14.

When the MD recorder/player 1 is in the analog input mode, if an analog audio signal is being outputted from a predetermined audio apparatus connected to the analog line input terminal 18, then the analog audio signal passes a predetermined signal processing path, that is, through the A/D converter 19, encoder/decoder 14, D/A converter 15 and output processing section 16, in the MD recorder/player 1 and is outputted from the line output terminal 17. Consequently, a condition is obtained wherein the signal inputted from the analog line input terminal 18 is outputted as an audio output from the speaker 107 through the audio amplifier 106 shown in FIG. 13.

If it is assumed that, for example, the user performs a depression operation of the input selection key 23a once while the MD recorder/player 1 is in the analog input mode described above, then the input mode is switched to the digital audio input mode as indicated as stage ② in FIG. 14. Upon such switching, if digital audio data is being inputted from another AV apparatus through the digital interface 22 (IEC 958), then also in this instance, a state is obtained wherein the audio data being supplied, for example, along a signal processing path including the encoder/decoder 14, D/A converter 15 and output processing section 16 to the digital interface 22 is outputted or reproduced as an audio output from the speaker 107.

Then, if the user further performs a depression operation of the input selection key 23a once while the MD recorder/player 1 is in the digital audio input mode, then the input mode is switched to the i link input mode as indicated as stage ③ in FIG. 14.

When the i link input mode is entered, the IEEE 1394 interface 25 operates to successively scan the channels ch0 to ch63, for example, from the channel ch63 to the channel ch0 in accordance with the channel number to search for the channel to be received.

If the IEEE 1394 interface 25 first scans the channel ch63 as indicated as stage ④, then video stream data of the digital video camera 105 is received. However, since the video stream data is not data of a format which can be processed by the MD recorder/player 1, the channel ch63 is skipped, and channel scanning of the channels ch62 et seq. is performed.

According to the description given hereinabove with reference to FIG. 13, the channel ch62 is a free channel which is not used by any of the transmission apparatus of the system. Consequently, when the channel ch62 is scanned as indicated as stage ⑤, no data is received by the IEEE 1394 interface 25. When any free or unused channel like the channel ch62 is scanned, the IEEE 1394 interface 25 skips the unused channel and then successively scans the succeeding channels.

Thus, in this instance, when the IEEE 1394 interface 25 scans the channel ch50 as indicated as stage ⑥ in FIG. 14 after it skips the unused channels ch62 to ch51, it receives audio stream data of the CD player (A) 101. Here, the audio stream data is data of a format which can be processed by the MD recorder/player 1. In other words, the audio stream data can be recorded onto a disc if audio compression processing is performed therefor.

When audio data which can be processed by the MD recorder/player 1 is received in this manner, the IEEE 1394 interface 25 stops its scanning operation and thereafter maintains the state in which it selects the channel. In other words, a state where the channel ch50 is kept selected in the i link input mode is established.

Thus, when the input selection key 23a is operated in the stage ②, if this is viewed from the user side, the state (stage ⑥) wherein the input mode is switched from the digital audio input mode to the i link input mode and the channel ch50 is selected in the i link input mode is established immediately.

Since the MD recorder/player 1 receives audio data of the CD player (A) 101 which occupies the channel ch50 and transmits data, the MD recorder/player 1 outputs the audio data as an audio output from the speaker 107. More particularly, for example, the system controller 11 transmits the audio data of the channel ch50 received from the IEEE 1394 interface 25 to the memory controller 12. The memory controller 12 performs control for data transfer so that the audio data may be supplied from the D/A converter 15 to the line output terminal 17 through the output processing section 16.

If the user further operates the input selection key 23a in the state of stage ⑥ wherein the channel ch50 is selected, then scanning of the IEEE 1394 interface 25 is re-started from the channel ch49. Since the channels ch49 to ch31 are free channels, they are skipped as seen from FIG. 14, and when the channel ch30 is scanned as indicated as stage ⑦ in FIG. 14, audio stream data of the CD player (B) 102 is inputted. Then, the scanning operation is stopped and the state in which the channel ch30 is selected is maintained similarly as in stage ⑥ described above. Thus, audio data of the CD player (B) 102 received over the channel ch30 is outputted as an audio output from the speaker 107.

Then, if the input selection key 23a is further operated in the state of stage ⑦, then scanning is executed and the free channels ch29 to ch11 are skipped. Then, when the channel ch10 is scanned and received as indicated as stage ⑧, audio stream data transmitted from the IRD 103 is inputted.

Since the audio stream data in this instance is also data which can be processed by the MD recorder/player 1, the scanning is stopped and the state wherein the channel ch10 is selected is established. Then, the audio stream data from the IRD 103 being received at present is outputted as an audio output from the speaker 107.

It is assumed that the input selection key 23a is further operated in the state of step ⑧.

In this instance, the scanning is re-started from the channel ch9, and the channels ch9 to ch1 are skipped because they are free channels.

Then when the last channel ch0 is scanned as indicated as stage ⑨, video stream data transmitted from the digital video deck 104 is obtained. However, the channel ch0 is skipped by a similar reason to that described hereinabove in connection with step ④.

When the skipping is performed in stage ⑨, since all of the channels have been scanned in a round, there remains no channel to be scanned. In this instance, the i link input mode is cancelled automatically, and the MD recorder/player 1 re-enters the state wherein the analog input mode is selected as indicated as stage ①.

In this manner, in the present embodiment, switching of the input source can be performed through the three modes of the analog input mode, digital audio input mode and i link input mode by performing a so-called toggle operation for the input selection key 23a. Further, in the i link input mode, a channel (that is, an AV apparatus) over which audio data which can be processed by the MD recorder/player 1 is transmitted can be selected in response to an operation of the input selection key 23a.

Thus, every time the user operates the input selection key 23a, the user can listen to an audio output reproduced by the speaker and confirm whether or not the audio output is a desired input source. Then, if the user operates, for example, a recording key when the reproduced audio output is a desired input source, then the input source currently selected can be recorded onto a disc.

Where the operation procedure for input source selection is designed in such a manner as described above, for example, the following advantages can be achieved.

For example, when a method of selecting an input source on the IEEE 1394 bus is considered as described above, it is determined fixedly in advance that the MD recorder/player 1 can receive only one predetermined channel, and the transmission side uses the channel to effect transmission to the MD recorder/player 1. In this instance, no particular operation for selecting a channel is required, and it is required only to interconnect the transmission side apparatus and the MD recorder/player 1 with an IEEE 1394 bus. This, however, gives rise to a disadvantage that contention for occupation of the same channel occurs between a plurality of transmission apparatus or advantages of multi-channels in Isochronous communication cannot be made most of.

Also another technique seems possible wherein a personal computer is included in an AV system implemented by connection with an IEEE 1394 bus and application software of the personal computer is used to specify a connection relationship between a transmission side apparatus and the MD recorder/player 1 by an operation of, for example, on a GUI. In this instance, for example, for communication of audio data, since the transmission channel of the transmission apparatus and the reception channel of the MD recorder/player 1 side can be set to the same channel, data transmission can be performed through the point to point connection shown in FIG. 11.

However, where such a form as described above is adopted, since at least a personal computer is required, the scale of the system becomes large as much and the system cannot complete itself only with AV apparatus. This imposes a burden to the user.

In contrast, with the MD recorder/player 1 of the present embodiment, since an input selection operation is realized by toggle key operation, an input source can be selected by very simple and plain operation. Further, this operation does not rely upon such an apparatus as a personal computer but completes itself only with operation for the input selection key 23a provided on the MD recorder/player 1 only if a condition wherein audio data is transmitted from an AV apparatus as an input source is maintained as can be recognized also from the description given above with reference to FIG. 14.

Further, according to the input selection operation illustrated in FIG. 14, when scanning of the channels is performed in a round in the i link mode, then the mode for selecting an analog input or a digital audio (IEC 958) input other then the IEEE 1394 can be entered.

This signifies that the input selection operation of the present embodiment, that is, the toggle operation, follows a conventional input selection operation. In particular, according to a conventional input selection operation, switching between an analog input and a digital audio input is performed by toggle operation, and according to the present embodiment, the i link mode is added as a mode of the toggle operation to allow channel selection.

Accordingly, the user can select data transmitted over the IEEE 1394 bus in accordance with an operation procedure similar to that in the conventional input selection operation. Also in this regard, the input selection operation of the present embodiment is familiar to the user. Further, channel selection of the IEEE 1394 interface and selection of the other input systems can be handled by the same operation.

5-3. Processing Operation

Subsequently, processing operation for realizing the selection operation of an input source described above with reference to FIG. 14 is described with reference to a flow chart of FIG. 15. It is to be noted that the processing is executed by the system controller 11 of the MD recorder/player 1.

Figure 15:
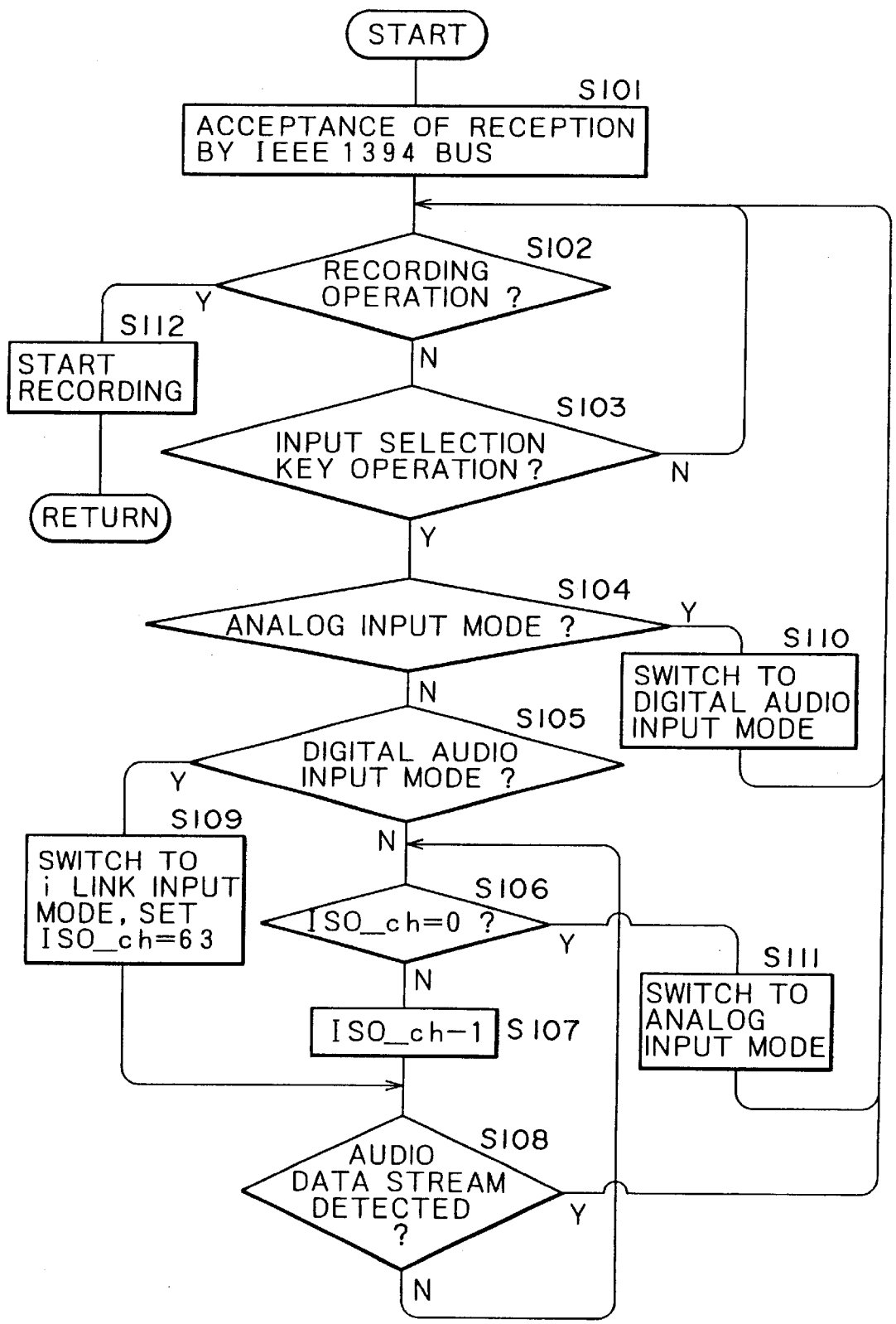
FIG. 15 is a flow chart illustrating a procedure of the AV system shown in FIG. 13 which is executed in response to an input selection key operation.

In the processing procedure illustrated in FIG. 15, first in step S101, the system controller 11 executes control of the IEEE 1394 interface 25 so that data can be received over the IEEE 1394 bus. In this instance, if necessary, the system controller 11 executes also processing of reading a program for realizing processing compliant with the IEEE 1394 interface from the ROM 28 into the RAM 29 and starting up the program.

It is to be noted that, at this point of time, one of the analog input mode, digital audio input mode and i link input mode or some channel is selected. For example, the processing may be started with a mode and a channel which have been selected and stored by an operation of the input selection key 23*a* performed last.

Then, in steps S102 and S103, the system controller 11 discriminates that an operation for starting recording and an operation of the input selection key 23*a* are performed, respectively.

If it is discriminated in step S102 that an operation for starting recording is performed, then recording of a signal inputted from the mode/channel being currently received is started in step S112.

If it is discriminated in step S103 that an operation of the input selection key 23*a* is performed, then the control of the system controller 11 advances to step S104.

In step S104, the system controller 11 discriminates whether or not the current input mode is the analog input mode. If the current mode is the analog input mode, then the system controller 11 advances the control to step S110, in which it executes processing for switching the input mode to the digital audio input mode, whereafter the control returns to step S102. This corresponds to the transition from stage ① to stage ② described hereinabove with reference to FIG. 14.

If the input mode is switched to the digital audio input mode, then pertaining functioning circuit sections of the MD recorder/player 1 are set to a state wherein they can perform signal processing for audio data inputted from the digital interface 22.

On the other hand, if it is discriminated in step S104 that the current input mode is not the analog input mode, then the control of the system controller 11 advances to step S105, in which the system controller 11 discriminates whether or not the current input mode is the digital audio input mode.

If it is discriminated in step S105 that the current input mode is the digital audio input mode, then the system controller 11 advances the control to step S109, in which it executes processing for switching the input mode to the i link input mode. Consequently, a condition of the MD recorder/player 1 wherein various processing can be executed under the control of the system controller 11 is established. The processing here corresponds to the transition from stage ② to stage ③.

Further, in step S109, the reception channel for an Isochronous packet by the IEEE 1394 interface 25 is set to the channel ch63 (iso_ch=63) as an initial value. In other words, a condition wherein a PIC packet transmitted using the channel ch63 can be received is established.

After the processing in step S109 is completed, the system controller 11 advances the control to step S108.

On the other hand, if it is discriminated in step S105 that the current input mode is not the digital audio input mode, then this signifies that the current input mode is the i link input mode.

In this instance, the control advances to step S106, in which the system controller 11 discriminates whether or not the channel selected in the i link input mode at the point of time when the input selection key 23*a* is operated as discriminated in step S103 above is the channel 0ch (iso_ch=0).

If it is discriminated here that the selected channel is the channel ch0, then the control advances to step S111, in which the system controller 11 switches the input mode to the analog input mode, whereafter the control returns to step S102. In the analog input mode, required functioning circuit sections are set so that signal processing can be performed for an analog audio signal inputted from the analog line input terminal 18. This processing corresponds to the transition from stage ⑨ to stage ①.

On the other hand, if it is discriminated in step S106 that the selected channel is not the channel 0ch (iso_ch=0), then the control advances to step S107, in which the system controller 11 executes processing for decrementing the channel number to be received by the IEEE 1394 interface by one.

Then, after the processing in step S107 or S109 is performed, the control advances to step S108, in which it is discriminated whether or not an audio data stream which can be processed by the MD recorder/player 1 is detected when the channel currently set by the IEEE 1394 interface is received.

As operation in step S108, the IEEE 1394 interface 25 compares the channel number set to receive by the system controller 11 and the channel number placed in the area for channel of the 1394 packet header of each of PICs successively transmitted thereto over the IEEE 1394 bus with each other. Then, if a PIC packet whose channel number exhibits coincidence is detected, then the PIC packet is fetched, and, for example, information stored in the areas for FMT (signal format) and FDF (format dependent field) of the CIP header is referred to to discriminate whether or not the format of data transmitted by the CIP is that of the audio data stream corresponding to the MD recorder/player 1. The system controller 11 controls so that such operation of the IEEE 1394 interface 25 may be executed appropriately.

It is to be noted that, when it is discriminated that no CIP has a channel number which coincides with the channel number set to the IEEE 1394 interface 25, the channel is discriminated as a free channel.

Here, it is assumed that audio data streams which can be processed by the MD recorder/player 1 are linear audio data for a CD or a DAT whose sampling frequency is 44.1 KHz and whose number of quantization bits is 16 bits and audio data (ATRAC data) compressed in accordance with the ATRAC method. However, if the MD recorder/player 1 includes a converter which can convert the sampling frequency, then also, for example, 48 KHz sampled audio data of the direct broadcasting B mode or the DAT standard, 32 KHz sampled audio data of the direct broadcasting A mode and so forth can be used as audio data streams which can be processed by the MD recorder/player 1.

If it is discriminated in step S108 that the audio data in question is not an audio data stream which can be processed by the MD recorder/player 1 or the channel is free, then the control returns to step S106. The processing repeated in steps S106 to S108 realizes the skipping operation described hereinabove with reference to FIG. 14.

If it is discriminated in step S108 that the audio data in question is an audio data stream which can be processed by the MD recorder/player 1, then the control returns to step S102.

If it is discriminated in the processing procedure described above that an operation for starting recording is performed in step S102, then the control advances to step S112.

In step S112, the system controller 11 executes such required signal processing as described hereinabove with reference to FIG. 1 for the input source currently selected to execute control processing for starting recording onto a disc.

It is to be noted that the present invention is not limited to the construction of the present embodiment described above.

For example, while, in the embodiment described above, channel selection in the i link mode and selection of the analog input mode or the digital audio input mode can be performed in response to an operation of the input selection key 23a, according to the present invention, an operation procedure of the input selection key 23a may be applied only to channel selection in the i link mode. In this instance, for example, in the process of FIG. 14, the stage ⑨ should be followed by the stages ④ and ⑤ and further by the stage ⑥ bypassing the stages ① and ②.

Further, while, in the embodiment described above, for example, an MD recorder/player is taken as an example as a reception apparatus which performs selection of an input source, the present invention can be applied to various digital audio apparatus such as, for example, a DAT (Digital Audio Tape recorder/player) or a AV (Audio and Video) amplifier which includes an IEEE 1394 interface.

Furthermore, while it is described that the data format for which the MD recorder/player 1 of the present embodiment is ready is audio stream data, the present invention can be applied also to an apparatus which selects an input source, for example, for video stream data. In this instance, in order for a user to confirm an input source, an image of the input source should be displayed, for example, on a monitor unit.

Further, the format of the digital interface is not limited to the IEEE 1394, and the present invention can be applied, for example, to an existing interface and an interface which may appear in the future only if it can transmit/receive stream data in multi-channels.

As described above, according to a reception apparatus and method of the present invention, each transmission side apparatus uses a channel allocated thereto to effect transmission without specifying a reception side apparatus while a reception side apparatus executes a channel scanning operation in response to an input selection key and then stops, when a channel over which data of a format which can be processed by the reception apparatus is transmitted is obtained, the scanning operation till then and selects the channel.

More specifically, according to the present invention, each time the input selection key is operated, a channel over which data which can be processed by the reception apparatus is transmitted is successively selected. Consequently, the user can select a desired input source from among data which are transmitted using channels successively selected in this manner.

In such a form of operation as described above, for example, multi-channels of a data interface can be utilized effectively, and such a disadvantage as contention of a channel among a plurality of transmission apparatus when the same channel is used fixedly can be eliminated.

Further, when compared with another form of operation wherein a channel is designated on a GUI (Graphic User Interface) using a personal computer or the like, the input source selection operation in the present invention is completed by the apparatus itself and can provide an operation procedure which is comparatively familiar with a user and is very simple and plain. Further, there is no need of particularly preparing a personal computer, and the system construction can be simplified and also the economical burden to the user can be reduced.

Further, if the reception apparatus is constructed such that, when it receives data which can be processed by the reception apparatus itself, it externally outputs information representing what the received data is in such a manner that the user can recognize it, then the user can confirm the contents of the data externally outputted in such a manner that the contents of the data are switched for each channel selected by an input selection operation and discriminate whether or not the data is a desired input source.

Particularly where the data which can be processed by the reception apparatus is audio data, if the reception apparatus is constructed such that it can externally output the received audio data as sound, then the user can listen to contents of the sound, which vary in response to an input selection operation, and select a desired input source readily.

Furthermore, where the reception apparatus is constructed such that channel selection compliant with the predetermined data interface and selective switching of data obtained from another input system can be performed in response to an operation of the input selection key, source selection from among various input systems can be achieved by simple operation which includes only operation of the input selection key.

While a preferred embodiment of the present invention has been described using specific terms, such description is for illustrative purposes only, and it is to be understood that changes and variations may be made without departing from the spirit or scope of the following claims.

What is claimed is:
1. A reception apparatus, comprising:
an analog input terminal to which an analog signal is supplied from a first source device to be connected;
an optical input terminal to which a digital signal in the form of an optical signal is inputted from a second source device to be connected;
a digital input terminal to which a plurality of electronic apparatus are connected by a chain connection over a transmission line which allows data transmission by synchronous communication and asynchronous communication;
operation means for selecting from one of said analog input terminal, said optical input terminal and said digital input terminal;
search means for successively searching a source electronic apparatus from said plurality of electronic appa- ratus connected to said transmission line when said digital input terminal is selected by said operation means;

discrimination means for discriminating whether or not data supplied from the electronic apparatus searched out by said search means has a form compliant with a format; and control means for controlling so that, when said discrimination means discriminates that the data supplied from the searched out electronic apparatus has a form compliant with the format, demodulation of the data is started, but when said discrimination means discriminates that the data supplied from the searched out electronic apparatus does not have a form compliant with the format, searching for another one of said electronic apparatus may be started by said search means.

2. A reception apparatus according to claim 1, further comprising recording means for recording, when said discrimination means discriminates that the data supplied from the searched out electronic apparatus has a form compliant with the format, the demodulated data onto a recording medium.

3. A reception apparatus according to claim 1, wherein the digital signal inputted to said optical input terminal is compliant with the IEC 958 format.

4. A reception apparatus according to claim 1, wherein the digital signal inputted to said digital input terminal is compliant with the IEEE 1394 format.

5. A reception apparatus according to claim 1, wherein said transmission line is capable of transmitting data of a plurality of channels corresponding to said plurality of electronic apparatus connected by the chain connection, and said search means performs the search by successively switching the channel for reception among the channels.

6. A reception method for a reception apparatus which includes an analog input terminal to which an analog signal is supplied from a first source device to be connected, an optical input terminal to which a digital signal in the form of an optical signal is inputted from a second source device to be connected, a digital input terminal to which a plurality of electronic apparatus are connected by a chain connection over a transmission line which allows data transmission by synchronous communication and asynchronous communication, and a key for selecting from one of said analog input terminal, said optical input terminal and said digital input terminal, comprising the steps of:

successively searching a source electronic apparatus from said plurality of electronic apparatus connected to said transmission line when said digital input terminal is selected by an operation of said key;

discriminating whether or not data supplied from the electronic apparatus searched out by said search means has a form compliant with a format; and starting, when it is discriminated that the data supplied from the searched out electronic apparatus has a form compliant with the format, demodulation of the data, but searching, when it is discriminated that the data supplied from the searched out electronic apparatus does not have a form compliant with the format, for another one of said electronic apparatus connected by the chain connection.

7. A reception method according to claim 6, wherein the digital signal inputted to said optical input terminal is compliant with the IEC 958 format.

8. A reception method according to claim 6, wherein the digital signal inputted to said digital input terminal is compliant with the IEEE 1394 format.

9. A reception method according to claim 6, wherein said transmission line is capable of transmitting data of a plurality of channels corresponding to said plurality of electronic apparatus connected by the chain connection, and the search is performed by successively switching the channel for reception among the channels.

* * * * *